United States Patent [19]
Sato

[11] Patent Number: 5,805,349
[45] Date of Patent: Sep. 8, 1998

[54] RETROFOCUS TYPE LENS

[75] Inventor: Haruo Sato, Kawaguchi, Japan

[73] Assignee: Nikon Corporation, Tokyo, Japan

[21] Appl. No.: 721,195

[22] Filed: Sep. 27, 1996

[30] Foreign Application Priority Data

Oct. 13, 1995 [JP] Japan ................................. 7-292111
Oct. 13, 1995 [JP] Japan ................................. 7-292112

[51] Int. Cl.⁶ ............................ G02B 15/14; G02B 9/00; G02B 13/04
[52] U.S. Cl. .......................... 359/682; 359/684; 359/679; 359/691; 359/740; 359/753
[58] Field of Search .................. 359/749–753, 359/740, 682, 684, 691, 679

[56] References Cited

U.S. PATENT DOCUMENTS

| | | | |
|---|---|---|---|
| 3,748,021 | 7/1973 | Tajima et al. | 359/749 |
| 4,111,558 | 9/1978 | Ikemori | 359/750 |
| 4,310,222 | 1/1982 | Ikemori | 359/749 |
| 4,400,064 | 8/1983 | Ikemori et al. | 359/749 |
| 4,726,667 | 2/1988 | Tachihara | 359/682 |
| 4,806,003 | 2/1989 | Mukai et al. | 359/751 |
| 4,818,082 | 4/1989 | Kreitzer | 359/682 |
| 5,076,677 | 12/1991 | Sato | 359/691 |
| 5,157,550 | 10/1992 | Tsuchida et al. | 359/684 |
| 5,321,553 | 6/1994 | Ishiyama et al. | 359/691 |
| 5,329,401 | 7/1994 | Sato | 359/684 |
| 5,339,195 | 8/1994 | Ogata | 359/691 |
| 5,513,045 | 4/1996 | Ito et al. | 359/750 |
| 5,539,581 | 7/1996 | Sato | 359/691 |
| 5,546,232 | 8/1996 | Hirakawa | 359/691 |
| 5,552,937 | 9/1996 | Ono et al. | 359/691 |
| 5,592,334 | 1/1997 | Oshikiri et al. | 359/684 |
| 5,631,780 | 5/1997 | Sato | 359/749 |
| 5,661,606 | 8/1997 | Sato | 359/682 |

FOREIGN PATENT DOCUMENTS

| | | |
|---|---|---|
| 59-216114 | 12/1984 | Japan . |
| 62-291613 | 12/1987 | Japan . |
| 3-5714 | 1/1991 | Japan ................................. 359/691 |
| 4-50910 | 2/1992 | Japan . |
| 5-34592 | 2/1993 | Japan . |
| 5-119254 | 5/1993 | Japan . |
| 5-188294 | 7/1993 | Japan . |
| 548898 | 6/1993 | United Kingdom ............. 359/691 |

*Primary Examiner*—Georgia Y. Epps
*Assistant Examiner*—Evelyn A. Lester
*Attorney, Agent, or Firm*—Oliff & Berridge, PLC

[57] ABSTRACT

A retrofocus type lens uses a rear focus method that provides high image forming performance. A retrofocus type lens includes, from an object side, a first lens group $G_1$ having negative refractive power, which has a negative meniscus lens component $L_A$ having a convex surface facing an object side and a positive lens component $L_B$ positioned closer to the image side than the negative meniscus lens component $L_A$. At least one surface among all of the lens surfaces of the first lens group $G_1$ is aspheric. A second lens group $G_2$ is provided and has positive refractive power. The second lens group G2 has, from the object side, a front group $G_{2F}$ and a rear group $G_{2R}$ having positive refractive power. Focusing on a near object point is accomplished by moving the front group $G_{2F}$ and the rear group $G_{2R}$ of the second lens group with different moving amounts. When the moving amount of the front group $G_{2F}$ and the rear group $G_{2R}$, during focusing from the infinite object point and the near object point are defined as $X_F$ and $X_R$, respectively, the following condition is satisfied:

$$1 < X_R/X_F \leq 5.$$

Additionally, when a focal length of the entire system is defined as f, and focal lengths of said first lens group $G_1$ and said second lens group are defined $G_2$ as $f_1$ and $f_2$, respectively, and a space between both lens groups $G_1$ and $G_2$ during focusing on the object point are defined as $D_{1-2}$, the following conditions are satisfied:

$$0.5 \leq |f_1|/f_2 \leq 2.4$$

$$0.3 \leq D_{1-2}/f \leq 2.5.$$

38 Claims, 31 Drawing Sheets

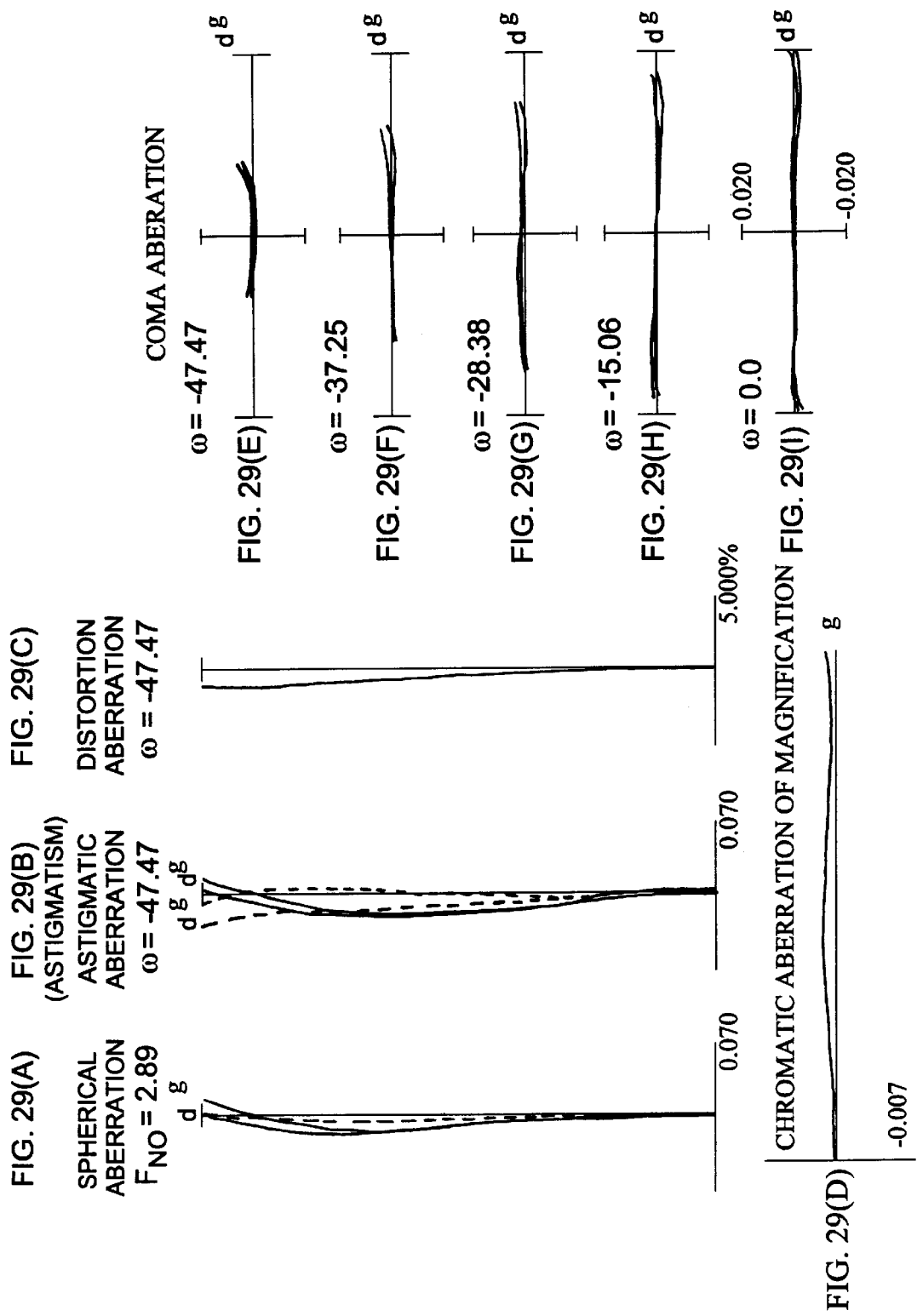

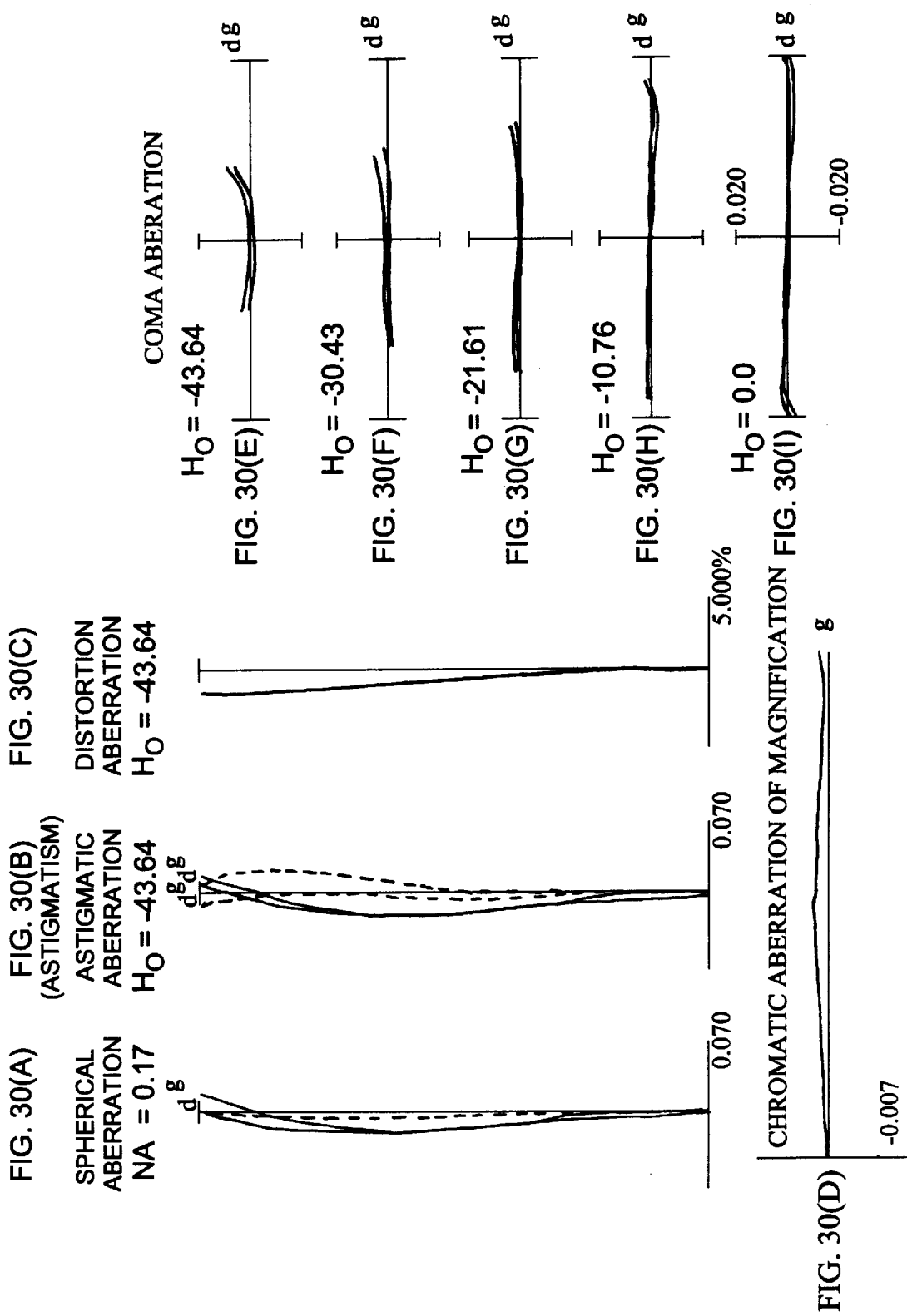

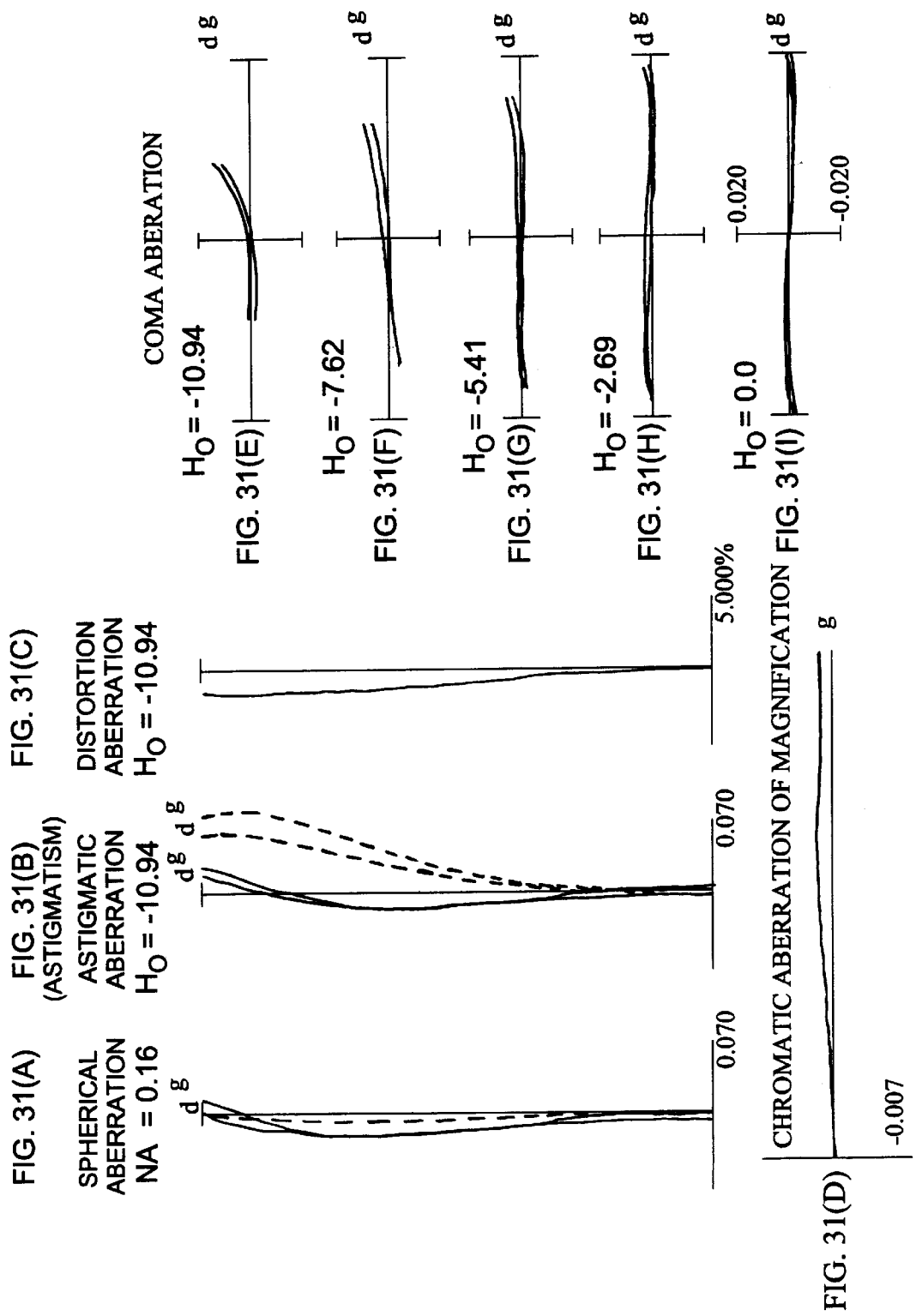

RETROFOCUS TYPE LENS

BACKGROUND OF THE INVENTION

1. Field of the Invention

The present invention relates to retrofocus type lenses using a rear focus method.

2. Description of Related Art

As a focusing method for a retrofocus type lens, there is a rear focus method that focuses by moving a rear part of a lens to improve performance in close distances and to improve performance in operation.

For a retrofocus type wide angle lens using the rear focus method (as disclosed in Japanese Laid-Open Patent Application 59-216114), the angle of view is $2\omega=64°$, which is relatively small. As a result, the achroma (achromatization) of a front negative lens group and a rear positive lens group, and the independent correction of aberrations in each group, are insufficient. Accompanying the movement of the rear group during focusing are: (i) fluctuations in aberrations outside the axis (i.e., curvature in image planes), (ii) astigmatism, and (iii) coma aberrations. When these fluctuations become great, fluctuations in chromatic aberrations of magnification occur that become an inconvenience. Therefore, when using a retrofocus type lens having an extremely large angle of view, the fluctuations of each aberration increase, thus making utilization thereof difficult.

Japanese Laid-Open Patent Application 62-291613 discloses a retrofocus type lens using superwide angles in which fluctuations of aberrations when focusing in close distances are reduced by moving two groups of lenses when focusing. However, with this focusing method, the correction of downward coma aberrations and actions taken for the fluctuations of the chromatic aberrations of magnification are not always sufficient. More sufficient achroma to each group and independent corrections of aberrations are desired for each moving group.

Japanese Laid-Open Patent Application 5-188294 discloses a retrofocus type lens with a large diameter and having relatively small angles of view in which, excepting the first lens group, a rear lens group is divided into three groups with each group having a moving focusing method. However, with this focusing method, because the rear lens group is divided into three groups, the mechanism becomes complicated and thus, costs increase. Moreover, achroma to each group is not always accomplished sufficiently. Since the independent correction of aberrations in each group is also not always accomplished sufficiently, there is fear of having fluctuations of magnified chromatic aberrations. Furthermore, as a problem in manufacturing, even if performance in forming images is achieved extremely well, there is little allowance for deviation from the standard in manufacturing (i.e., the manufacturing tolerances are strict). Additionally, lens eccentricity is not always considered to be of sufficient strength.

Japanese Laid-Open Patent Application 4-50910 discloses a retrofocus type lens using a rear focus method in which the maximum angle of view is $2\omega=100°$. However, in this retrofocus type lens, there is an inconvenience that the diameter of a negative front lens group is especially large. Moreover, as for the aberrations, correction of the downward coma aberration is not preferable. It also is necessary to make clear a separation for aberrational corrections of the front lens group and the rear lens group.

Japanese Laid-Open Patent Application 5-34592 discloses a retrofocus type lens using the rear focus method and having a large angle of view (the maximum angle of view is $2\omega=113°$). However, in this retrofocus type lens, there are the added inconveniences that the negative front lens group is extremely large (even when an aspheric surface is used) and that the number of composite lenses is large. From the aberrations point of view, the fluctuations of the chromatic aberrations in magnification are large when focusing at a close distance, and thus the division for the aberrational corrections between the negative front lens group and the positive rear lens group is also insufficient.

Japanese Laid-Open Patent Application 5-119254 discloses a superwide angle retrofocus type lens in which an aspheric surface is used in a negative lens component on the object side to make the lens system extremely compact. However, in this retrofocus type lens, the correction of the curvature of the image plane, the downward coma aberration, and the chromatic aberration of magnification is not always sufficient. Additionally, there are fluctuations of chromatic aberration in magnification when focusing. Furthermore, the number of composite lenses tends to be large, the structure is slightly complicated, and the diameter of the front lens group is enlarged.

SUMMARY OF THE INVENTION

Considering the above problems, it is an object of the invention to provide a retrofocus type lens using a rear focusing method that has a large angle of view, a relatively large aperture, and a high imaging capacity such that the lens: (i) performs in a stable manner over the entire focusing area, from an infinite distance to a near distance; (ii) minimizes fluctuations during focusing from curvatures of the image plane, from astigmatism, and from magnified chromatic aberration; (iii) minimizes the occurrence of unnaturally asymmetrical coma aberrations or chromatic aberrations of magnification; (iv) provides a small diameter front lens group; and (v) has a small number of structuring lenses.

The retrofocus type wide angle lens was developed from a reverse Galilean type converter attached to a master lens, such as a Tessar type lens. Consequently, the lens groups are designed so that the back focus is sufficiently secured to be used for a single reflex lens by sufficiently dividing a front group of negative lenses and a rear group of positive lenses with spaces and moving principal points toward an object. Because of this, from a power arrangement point of view, the front group of negative lenses and the rear group of positive lenses were substantially separated and an entering height h of an on-axis beam and entering height $h_e$ of beams outside the axis having a clear difference for each lens surface. Therefore, by sufficiently using the difference between the entering heights h and $h_e$ of the beams on the axis and outside the axis, there was an increased freedom of aberration correction. However, the clear division of the front and rear groups creates an enlargement of the entire system or an increase in the diameter of the front lens group. Moreover, if the angle of view increases, more enlargement in the diameter of the front lens group could occur. Thus, in recent retrofocus type wide angle lenses or superwide angle lenses, dividing the front and the rear groups has become less common. As a consequence, the large spaces have been compensated for by thickening the glass. However, for aberrations, imperfections (i.e., a possibility of a curvature between the curvature of the image plane and the chromatic aberration of magnification or an increase in differences) resulted from the angle of view of the downward coma aberration.

The causes of the above problems are considered to be: (i) that the division of the entering heights h and $h_e$ of the beams on the axis and outside the axis are not enough in each surface, (ii) that each lens is necessarily comprised of strong power and since the space between the front lens group and the rear lens group is not sufficiently secured, an enlargement of a deflection angle $\alpha_e$ of each entering beam (especially the beam outside the axis) results, and (iii) an increase in an amount of aberration in each surface. In order to solve these problems, it is necessary to provide a lens system with multiple lenses and to make the deflection angle $\alpha_e$ of the beam outside the axis, which enters to and is irradiated from each lens surface, as small as possible. As a result, the lens system becomes large, and the differences with a retrofocus type wide angle lens of a type in which the front group and the rear group are divided becomes extremely small.

Moreover, since this phenomenon occurs more readily in a superwide angle lens in which the angle of view exceeds 94°, lenses to which only a huge filter or no filter can be mounted due to an excessively large diameter of the front lens group, are common. Techniques for addressing these problems are to: (i) introduce an aspheric surface to the front group of the negative lenses, (ii) thin the front group, and (iii) apply a method for determining power positions of 2-group zoom lenses (negative and positive lenses) to a determination of a power position for the superwide angle lens. Furthermore, clearly dividing two lens groups, negative and positive, into the front lens group and the rear lens group is also beneficial for correcting aberrations and sufficiently accomplishes achroma. Thus, even if the positive rear lens group is moved for focusing, it is possible to minimize the fluctuations of each aberration (i.e., chromatic aberration).

In the invention, the negative front lens group and the positive rear lens group are sufficiently divided, and each group independently corrects aberrations. The diameter of the front lens group, the total length, back focus, the number of composite lenses, the amount of movement when focusing and the degradation of performance are substantially determined depending upon a power balance between the front lens group and the rear lens group and the size of the space between the front lens group and the rear lens group.

Moreover, the wider the superwide angle lens is made, the larger the entering height $h_e$ of the beam outside the axis becomes, resulting in a huge and thick negative front lens group. As a result, in the invention, the best composition of the negative front lens group is found from an aberrational composition of a negative and positive zoom lens. That is, a negative meniscus lens component $L_A$ and a positive lens component $L_B$, the latter being located closer to the image than the negative meniscus lens component $L_A$ are provided in a first lens group $G_1$ of the present invention. The lens system is made thin and compact with a small diameter by reducing the number of the composite lenses, by sufficiently maintaining the space between both lens components $L_A$ and $L_B$, and by introducing an aspheric surface in the first lens group $G_1$. If the first lens group $G_1$ does not satisfy the above necessary conditions, the enlargement of the lens system or the increase in the diameter of the front cell cannot be avoided, and thus one of the objectives of the invention cannot be achieved.

Furthermore, the invention introduces a method in which a second lens group $G_2$ is used as a focusing group to move towards the object when shooting at a close distance. As described earlier, it is desirable to use the second lens group $G_2$ (that is an all positive lens group) as a positive master lens group to accomplish an independent correction of aberrations. In other words, a lens composition is desired in which the aberrational fluctuations resulting from changes in the deflection angle $\alpha_e$ or the entering height $h_e$ of the beam outside the axis, that have occurred by focusing movement, is minimized as much as possible.

In the invention, the first lens group $G_1$ is comprised of a negative and positive zoom lens (i.e., an Ernoster type). However, since it is unnecessary to have as variable an amount of space as that in the second lens group $G_2$, use of a Gaussian type, Xenoter type or Olsometer type group (advantageous in an angle of view), is also possible. Accordingly, a lens composition in which an aperture diaphragm is positioned in or immediately before the second lens group is desired.

Additionally, in the invention, a floating method is introduced in which a variable space is set in the second lens group $G_2$, and focusing is accomplished by moving a front group $G_{2F}$ of the second lens group and a rear group $G_{2R}$ of the second lens group by a moving amount that is different in each group to reduce aberrations outside the axis (i.e., curvature of the image plane) as much as possible.

In addition, a basic lens composition and shape of the second lens group $G_2$ is primarily to be a composition, such as a Tessar type, Ernoster type or Gaussian type. When the Gaussian type becomes a base, a space exists in which an inclination $\alpha$ of the beam on the axis from an object in an infinite distance is relatively small, which is appropriate to a base of a floating method.

The invention is provided based on observations described above. That is, the invention is a retrofocus type lens comprised of a first lens group $G_1$ having negative refractive power, which has a negative meniscus lens component $L_A$ having a convex surface facing an object side and a positive lens component $L_B$ positioned closer to an image side than the negative meniscus lens component $L_A$. At least one surface among each lens surface of the first lens group $G_1$, is formed to be aspheric. The invention is also comprised of a second lens group $G_2$ having positive refractive power, which has, from the object side, a front group $G_{2F}$ having positive refractive power and a rear group $G_{2R}$ having positive refractive power. In the invention, focusing from an infinite object point to a near object point is accomplished by moving the front group $G_{2F}$ and the rear group $G_{2R}$ of the second lens group with different moving amounts. Furthermore, given the moving amount of the front group $G_{2F}$ and the rear group $G_{2R}$ when focusing from the infinite object point and the near object point as $X_F$ and $X_R$, respectively, the following condition is preferably satisfied:

$$1 < X_R / X_F \leq 5 \tag{1}$$

The above Condition (1) is for controlling the fluctuations of aberrations outside the axis that occur when focusing, especially the fluctuations of the curvature of the image plane and the astigmatism. In the space between the front group $G_{2F}$ and the rear group $G_{2R}$ of the second lens group, the smaller the inclination $\alpha$ of the beam outside the axis that enters a lens surface immediately thereafter, the more possible the fluctuations of aberrations outside the axis are without the fluctuations of spherical aberrations or the like. Therefore, when looking at the fluctuations of the aberrations outside the axis, such as the curvature of the image plane and the astigmatism, resulting from the changes in the spaces between the front group $G_{2F}$ and the rear group $G_{2R}$, if the value falls below the lower limit of Condition (1), the moving amount of the rear group $G_{2R}$ of the second lens group becomes less than that of the front group $G_{2F}$ of the second group. Therefore, a state in which a variable space used for floating expands when focusing from an infinite distance to a close distance. In the present invention, a floating method using a rear focus is introduced to correct a phenomenon that largely displaces, in a positive direction, the curvature of the image plane and the astigmatisms that occur when focusing in a close distance, and maintains an excellent correction of the curvature of the image plane and the astigmatism when focusing from the infinite distance to the close distance. Thus, in a direction where floating spaces widen in the close distance (near range), the curvature of the image plane and the astigmatism are displaced in a more positive direction and thus are worsened, which is not preferable since introducing the floating method becomes meaningless. If the lower limit of Condition (1) is changed to 1.2, the fluctuations of the aberrations, such as the curvature of the image plane and the astigmatism, are further reduced. In addition, if the lower limit of Condition (1) is changed to 1.3, the present invention can be even more effective.

On the other hand, if the upper limit of Condition (1) is exceeded, the moving amount of the rear group $G_{2R}$ of the second lens group becomes extremely large, making it more difficult to secure the floating space with the front group $G_{2F}$ of the second lens group. Moreover, in terms of the aberrations, a floating effect is applied excessively, and the curvature of the image plane and the astigmatism are displaced in a negative direction as opposed to the above description, which is not preferable. Thus, if the upper limit of Condition (1) is changed to 3.0 or 2.5, the present invention can be more effective.

Next, in the invention given focal lengths of the front group $G_{2F}$ and the rear group $G_{2R}$ of the second lens group as $f_{2F}$ and $f_{2R}$, respectively, that the following condition preferably is satisfied:

$$0.1 \leq f_{2R}/f_{2F} \leq 5 \qquad (2)$$

If the value $f_{2R}/f_{2F}$ falls below the lower limit of Condition (2), the power of the front group $G_{2F}$ of the second lens group is weakened compared to the rear group $G_{2R}$ of the second lens group. In that case, the inclination α of the beam outside the axis that enters the lens surface located closest to the object in the rear group $G_{2R}$ of the second lens group is diverged, and the value becomes relatively large. Therefore, if floating occurs when focusing, the fluctuation of the spherical aberration is accomplished by the size of the value for the inclination α. This is not preferable. Furthermore, in a dark optical system in which the fluctuations of spherical aberrations are allowed at some level, the rear group $G_{2R}$ of the second lens group is made to have strong power among the entire power of the second lens group $G_2$, which results in the upward coma aberrations being worsened, which is not preferable. If the lower limit of Condition (2) is changed to 0.2 or 0.3, a better power balance can be obtained, thus the present invention can be more effective.

On the other hand, if the upper limit of Condition (2) is exceeded, the power of the rear group $G_{2R}$ of the second lens group is weakened as opposed to that in the above description, and it becomes power-balanced, in which the power of the front group $G_{2F}$ of the second lens group is strengthened. Because of this, the inclination α of the beam on the axis that enters the lens surface closest to the object among the rear group $G_{2R}$ is converged and takes a relatively large value. Therefore, if floating occurs, the fluctuation of the spherical aberration is caused since the inclination α is large, which is not preferable. Moreover, it makes the front group $G_{2F}$ of the second lens group have a stronger power in relation to the entire power of the second lens group $G_2$.

Then, the largely diverged beam on the axis that enters from the first lens group $G_1$ has to be converged by strong power, causing the correction of the spherical aberration to be worsened, which is not preferable. By changing the upper limit of Condition (2) to 4 or 3.5, a better power balance is achieved, thus the invention can be more effective.

Next, in the invention, given: a focal length of the first lens group $G_1$ and a focal length of the second lens group $G_2$ (when focusing in an infinite distance) as $f_1$ and $f_2$, respectively, the following condition preferably is satisfied:

$$0.5 \leq |f_1|/f_2 \leq 2.4 \qquad (3)$$

Condition (3) maintains a balance of power between the first lens group $G_1$, which is the negative front group and the second lens group $G_2$, which is the positive rear group, at the most appropriate level.

If the value $|f_1|/f_2$ falls below the lower limit of Condition (3), because the power of the first lens group $G_1$ becomes extremely strong compared to that of the second lens group $G_2$, the diameter of the front lens group becomes small. This is undesirable because the downward coma aberrations, the curvature of the image plane, and the astigmatism cannot be properly corrected. By changing the lower limit of Condition (3) to 0.7, excellent correction of the aberrations is possible with fewer lenses.

On the other hand, if the upper limit of Condition (3) is exceeded, it causes the diameter of the front lens group to be enlarged since the power of the first lens group $G_1$ is weakened compared to the second lens group $G_2$. Moreover, when the power of the second lens group $G_2$ is overstrengthened, not only does the correction of the spherical aberrations tend to worsen, but it is also possible that the back focus will not be sufficiently secured, which is not preferred. Furthermore, by changing the upper limit of Condition (3) to be between 2 and 1.92, the lens system can become compact, and better correction of the aberrations can be obtained.

In the invention, given a focal length of the entire lens system and a space between the first lens group $G_1$ and the second lens group $G_2$ when focusing in the infinite distance as f and $D_{1-2}$, respectively, the following condition preferably is satisfied:

$$0.3 \leq D_{1-2}/f \leq 2.5 \qquad (4)$$

If the value $D_{1-2}/f$ falls below the lower limit of Condition (4), dividing the entering height $h_e$ and the inclination $α_e$ of the beam outside the axis, the entering height h and the inclination α of the beam on the axis of the first lens group $G_1$ and the second lens group $G_2$ become insufficient. As a result, not only the curvature of the image plane, the aspheric aberration, and the downward coma aberration worsen, but also an undesirable enlargement of the diameter of the front lens group is created. Furthermore, this is not preferable since the moving amount during focusing cannot be secured sufficiently. If the lower limit of Condition (4) is changed to 0.41 or 0.45, the correction of the aberration to the beam outside the axis is improved. In addition, if the lower limit of Condition (4) is changed to 0.5, it is possible to make the diameter of the front lens group smaller and to obtain a sufficient amount of ambient light.

On the other hand, if the upper limit of Condition (4) is exceeded, an undesirable enlargement of the total length of the lens system results. Moreover, if the value is achieved by thinning the first lens group $G_1$, an undesirable worsening of the aberrations outside the axis and insufficiency of the amount of ambient light result. If the upper limit of Condition (4) is changed to 2 or 1.5, however, the total length can be maintained short, which is preferable.

In the invention, given the focal length of the entire lens system and the focal length of the second lens group $G_2$ when focusing in the infinite distance as f and $f_2$, respectively, the following condition preferably is satisfied:

$$1.6 \leq f_2/f \leq 3 \tag{5}$$

If the value $f_2/f$ falls below the lower limit of Condition (5), because the power of the second lens group $G_2$ becomes extremely strong, the back focus, the correction of the spherical aberrations and the upward coma aberrations cannot be obtained. This is also not preferred because the fluctuations of the aberrations when focusing increase. If the lower limit of Condition (5) is changed to 1.75, better corrections of the aberration are possible.

On the other hand, if the upper limit of Condition (5) is exceeded, since the power of the second lens group $G_2$ is weakened, the total length of the lens system becomes large (long). In addition, because Petzval's sum is displaced in the negative direction, the astigmatism worsens, causing an undesirable increase in the number of composite lenses required to achieve a good correction of the aberrations. Additionally, this is not preferable because the moving amount increases when focusing, which causes an enlargement of the lens system. By changing the upper limit of Condition (5) to 2.6, a retrofocus type lens that is more compact and in which there is a good level of correction of the aberrations can be achieved.

In the invention, given the focal length of the first lens group $G_1$ and a focal length of the negative meniscus lens component $L_A$ of the first lens group $G_1$ as $f_1$ and $f_A$, respectively, the following condition preferably is satisfied:

$$0.1 \leq f_A/f_1 \leq 1.0 \tag{6}$$

If the value $f_A/f_1$ falls below the lower limit of Condition (6), the negative meniscus lens component $L_A$ has extremely strong power compared to the power of the first lens group $G_1$. Therefore, a negative lens that has the largest entering height $h_e$ of the beam outside the axis has extremely strong power, and thus sufficient correction of the aberrations outside the axis (i.e., the distortion and the curvature of the image plane) becomes difficult even if an aspheric surface is used.

On the other hand, exceeding the upper limit of Condition (6) means that the power of the negative lens having the largest entering height $h_e$ of the beam outside the axis becomes weak. Thus, exceeding the upper limit is not preferable since an increase in the diameter of the front cell and a decrease in the amount of the ambient light is caused. If the upper limit of Condition (6) is changed to be between 0.8 and 0.65, the present invention is more effective.

In the invention, given an Abbe number (which refers to the d-line of the positive lens component $L_B$) as $v_d$, the following condition preferably is satisfied:

$$vd < 45 \tag{7}$$

It is preferred that sufficient aberrational corrections and achroma are accomplished individually in each group. Therefore, when the first lens group $G_1$ is a negative lens group having relatively strong power, it is necessary to use a glass having high dispersion (that is, with a small Abbe number) in the positive lens component $L_B$ in the first lens group $G_1$ in order to sufficiently accomplish the achroma. Therefore, if the upper limit of Condition (5) is undesirably exceeded, the achroma of the first lens group $G_1$ cannot be accomplish sufficiently, and as a result the chromatic aberrations of magnification worsen greatly. If the upper limit of Condition (7) is changed to 35 or 30, better achroma becomes possible.

In the invention, given the focal length of the first lens group $G_1$ and the focal length of the positive lens component $L_B$ of the first lens group $G_1$ as $f_1$ and $f_B$, respectively, the following condition preferably is satisfied:

$$0.3 \leq f_B/|f_1| \leq 2.0 \tag{8}$$

If the value $f_B/|f_1|$ falls below the lower limit of Condition (8), because the power of the positive lens component $L_B$ becomes too strong, the lenses become thick and the edge of the lenses become thin. This causes difficult processing. Moreover, even if the problems relating to the aberrational corrections are solved, undesirable weak eccentricity occurs. By changing the lower limit of Condition (8) to 0.5, the present invention can be more effective.

On the other hand, if the upper limit of Condition (8) is exceeded, the power of the positive lens component $L_B$ becomes weak, and as a result, a plurality of other positive lenses are required to sufficiently correct the downward coma aberrations and the curvature of the image plane. This is not preferred due to the increase in costs and enlargement of the system. By changing the upper limit of Condition (6) to 1.7, the present invention can be more effective.

In the invention, given that the second lens group $G_2$ has at least one cemented lens, and preferably two or three, including a positive lens and a negative lens, and that the refractivity of the positive lens and the negative lens of the cemented lens with respect to the d-line is $n_P$ and $n_n$, respectively, the following condition preferably is satisfied:

$$0.15 \leq n_n - n_P \leq 0.5 \tag{9}$$

In the invention, in the case where a retrofocus type lens has both the first lens group $G_1$ and the second lens group $G_2$ with relatively strong power, it is desirable to use a cemented lens to make the Petzval's sum a positive value. If the value $n_n - n_P$ falls below the lower limit of Condition (9), the difference in the refractive rate between a negative lens and a positive lens in the cemented lens becomes extremely small. Petzval's sum also becomes excessively small, resulting in undesirably difficult corrections of the curvature of the image plane of the astigmatism. If the lower limit of Condition (9) is changed to 0.2 or 0.25, a better correction of the aberration is possible.

When the upper limit of Condition (9) is undesirably exceeded, due to the glass material used today, the dispersion of the negative lens becomes too large, which causes an excessive achroma.

In the invention, it is also preferable to place an aperture diaphragm in the second lens group $G_2$ or between the first lens group $G_1$ and the second lens group $G_2$. Moreover, it is even more desirable to place the aperture diaphragm in the second lens group $G_2$ and to place in front of and behind the aperture diaphragm, a cemented lens comprised by cementing at least a positive lens and a negative lens. In that case, it is desired that both cemented lenses satisfy Condition (9).

Moreover, in the invention, a negative component can be placed between the negative meniscus lens component $L_A$ and the positive lens component $L_B$ in the first lens group $G_1$.

Furthermore, for the aspheric surface used in the first lens group, having the entering height $h_e$ of the beam outside the axis relatively large is advantageous for the correction of distortion, the curvature of the image plane, or the like.

Providing a negative meniscus lens component $L_A$ is, therefore, desired. It is even more desirable to provide the component with a surface on the image plane side having a concave surface facing towards the image plane. Moreover, it is desired that, in a case of providing an aspheric surface in the negative lens component, the aspheric surface has a shape in which a curvature at a surrounding part is flatter than that of a center part. That is, a shape in which negative refractive power at the surrounding part becomes weaker compared to the center part. In addition, in a case of providing the aspheric surface in the positive lens component, the aspheric surface has a shape in which a curvature at a surrounding part is more curved than that of a center part. That is, a shape is preferred in which positive refractive power at the surrounding part becomes embodiments of stronger compared to the center part.

Other objects, advantages and salient features of embodiments the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein:

FIGS. 29(A)–(I) are aberrational graphs of the ninth embodiment ($D_0=\infty$);

FIGS. 30(A)–(I) are aberrational graphs of the ninth embodiment ($\beta=-0.025$); and FIGS. 31(A)–(I) are aberrational graphs of the ninth embodiment ($\beta=-0.1$).

DETAILED DESCRIPTION OF PREFERRED EMBODIMENTS

Figure 1:
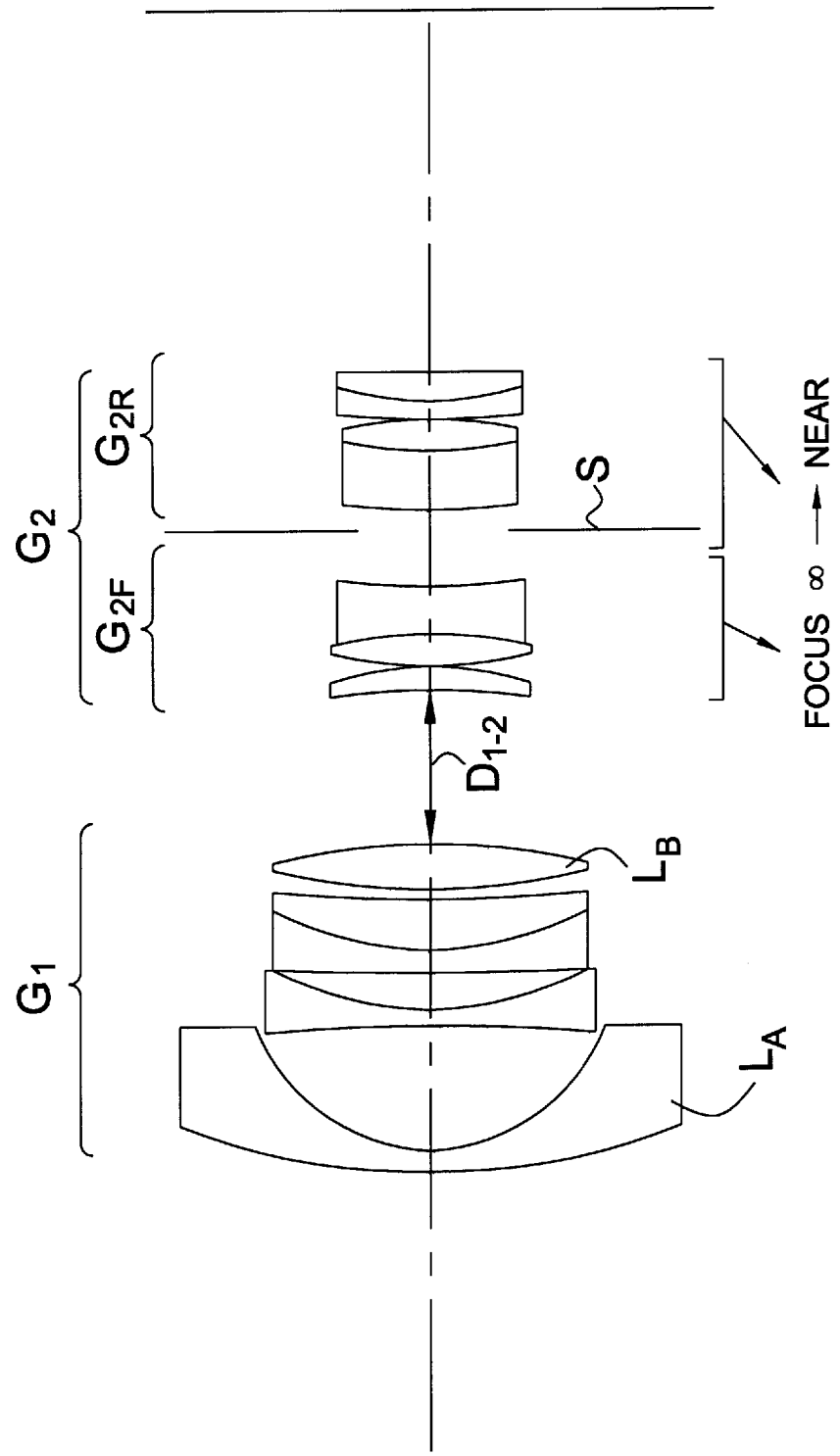
FIG. 1 is a side schematic view of a lens according to a first embodiment of the invention.
Figure 4:
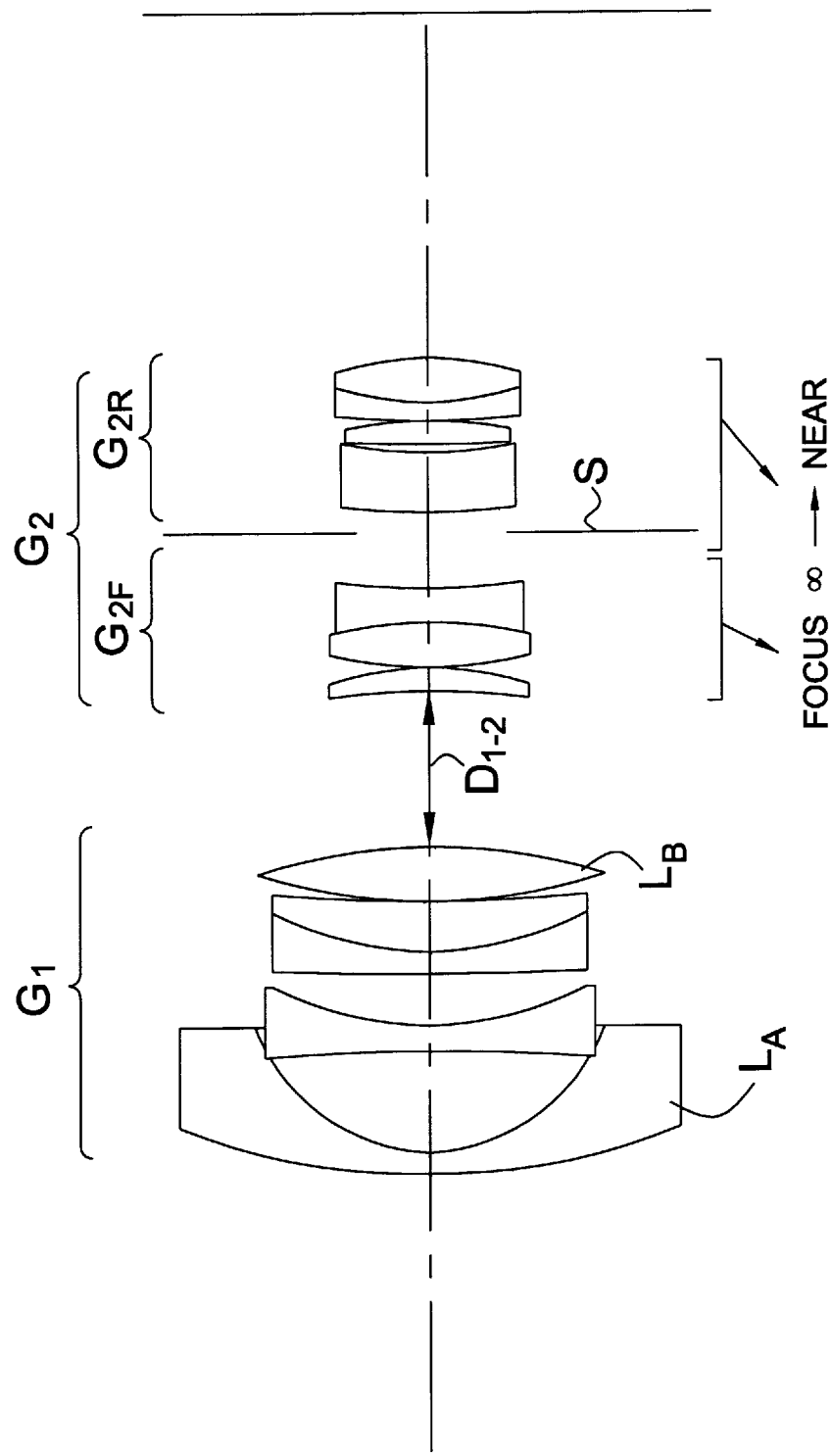
FIG. 4 is a side schematic view of a lens according to a second embodiment of the invention.
Figure 7:
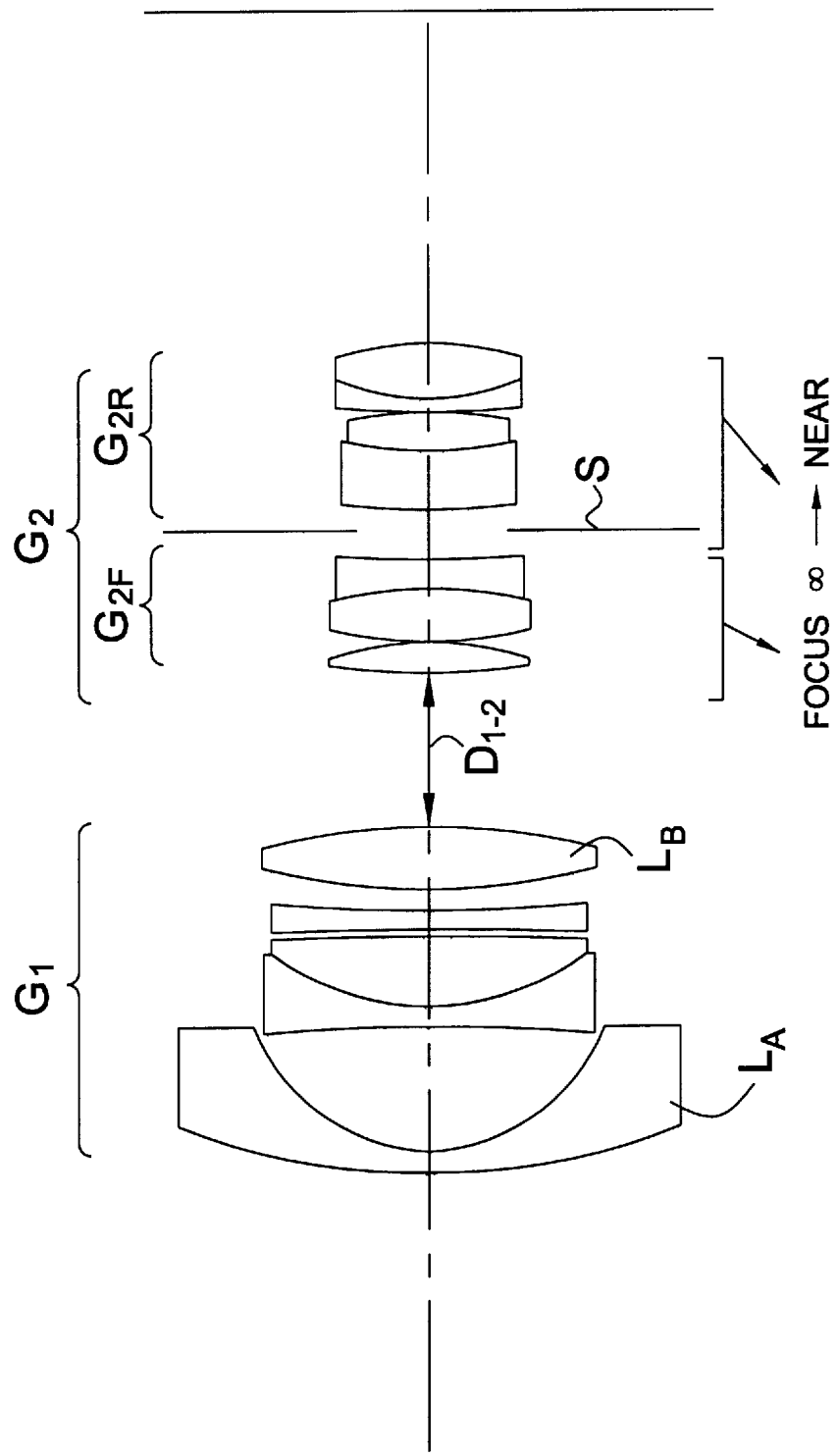
FIG. 7 is a side schematic view of a lens according to a third embodiment of the invention.
Figure 10:
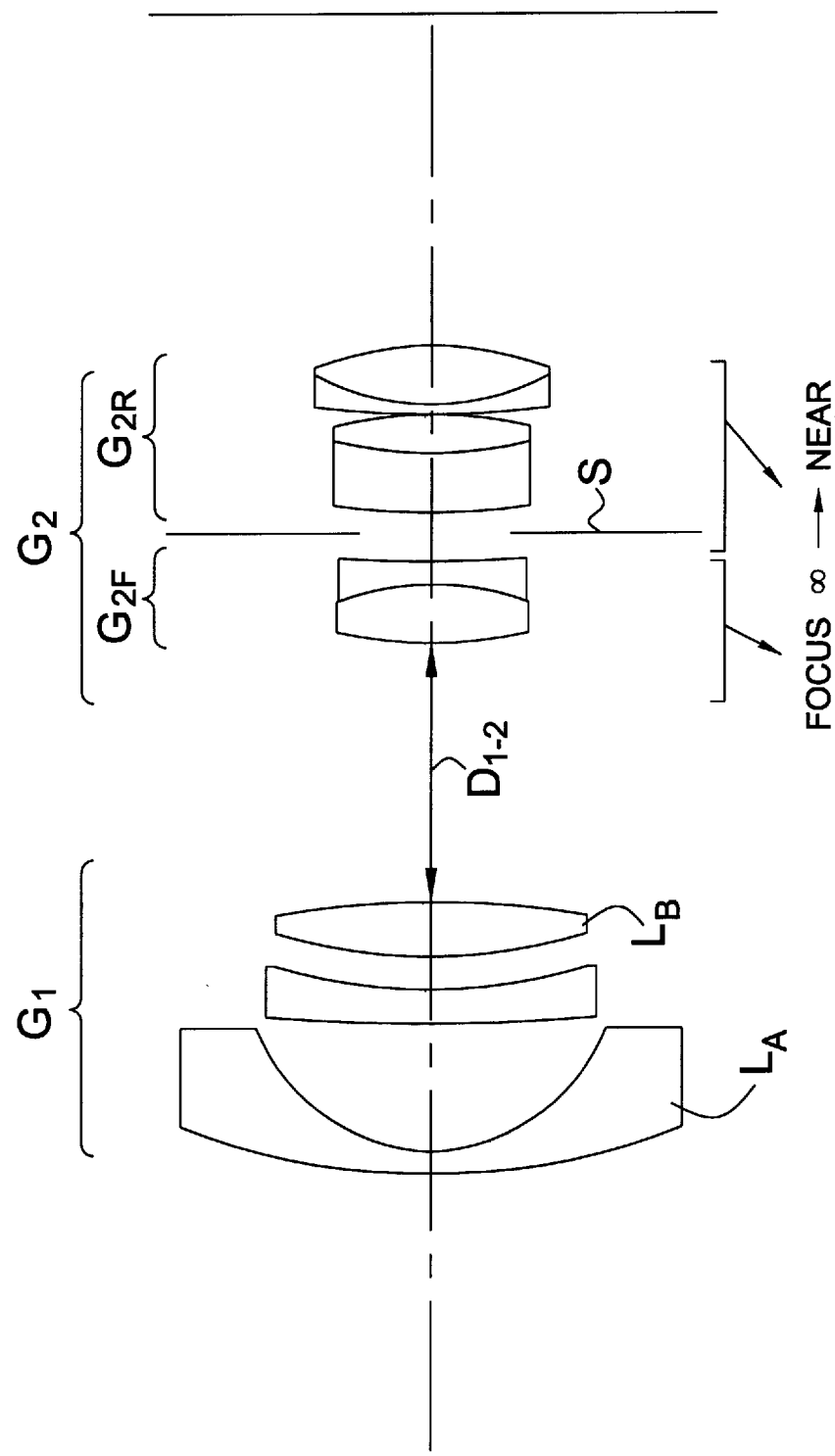
FIG. 10 is a side schematic view of a lens according to a fourth embodiment of the invention.
Figure 13:
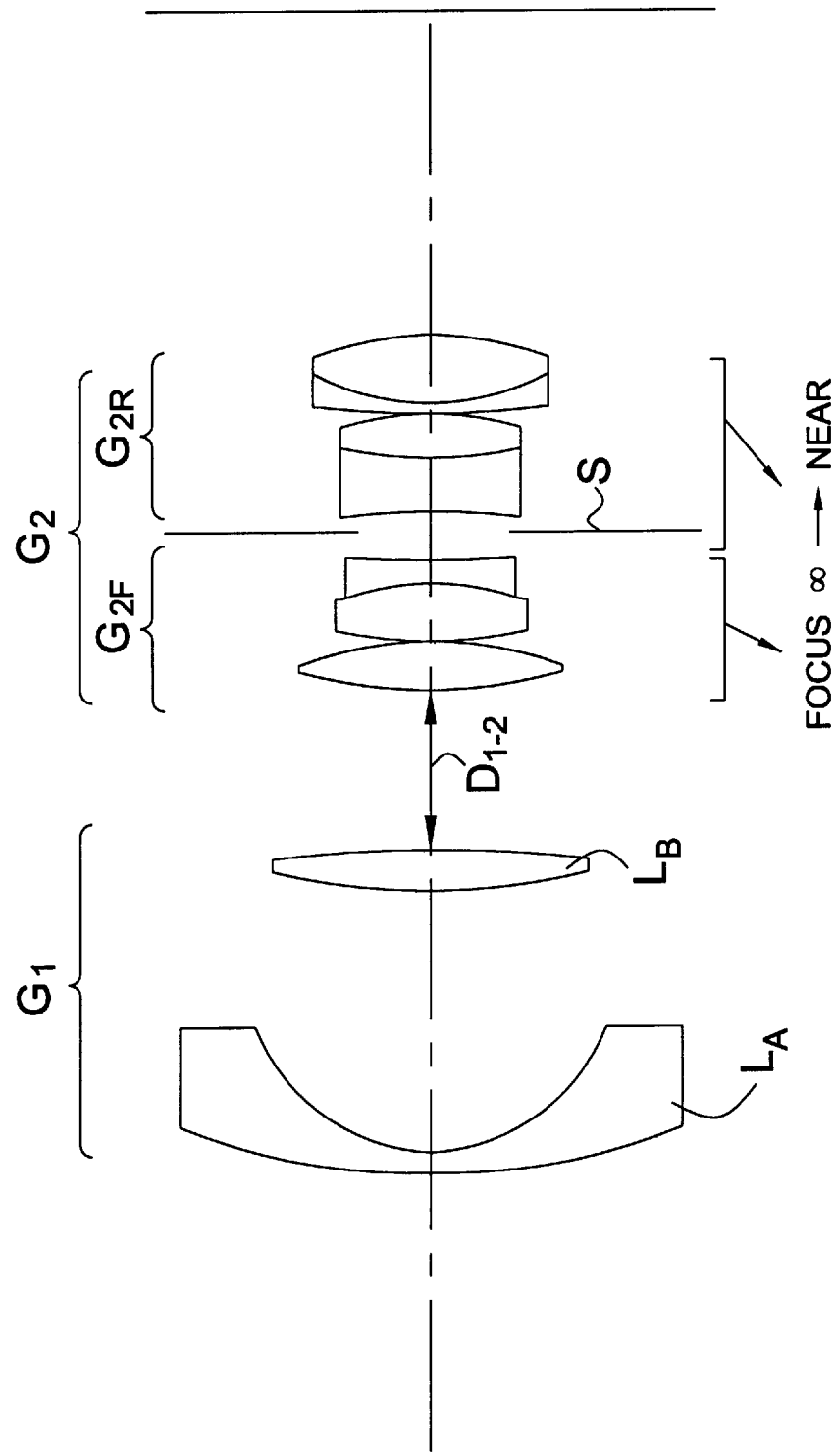
FIG. 13 is a side schematic view of a lens according to a fifth embodiment of the invention.
Figure 16:
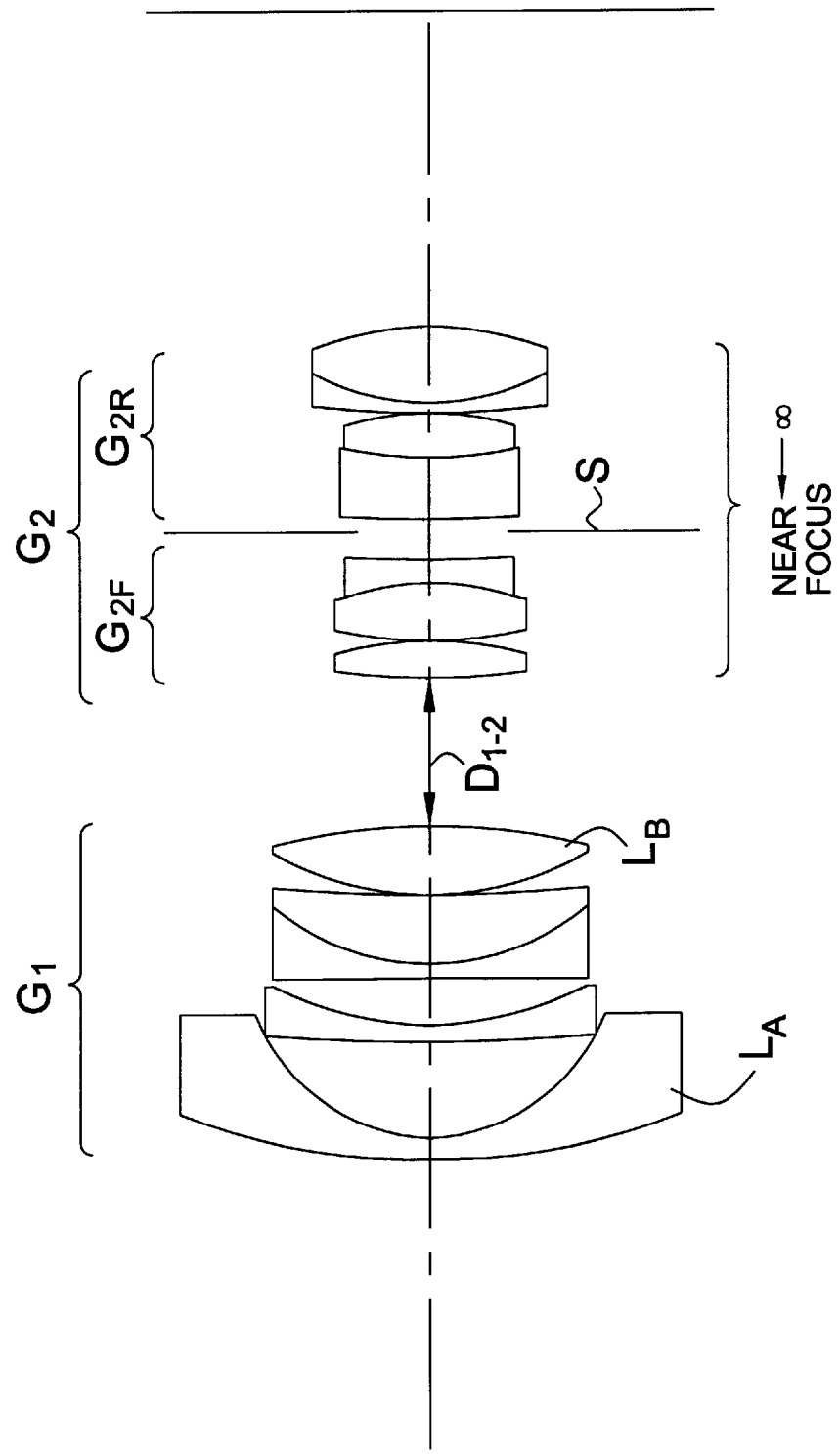
FIG. 16 is a side schematic view of a lens according to a sixth embodiment of the invention.
Figure 20:
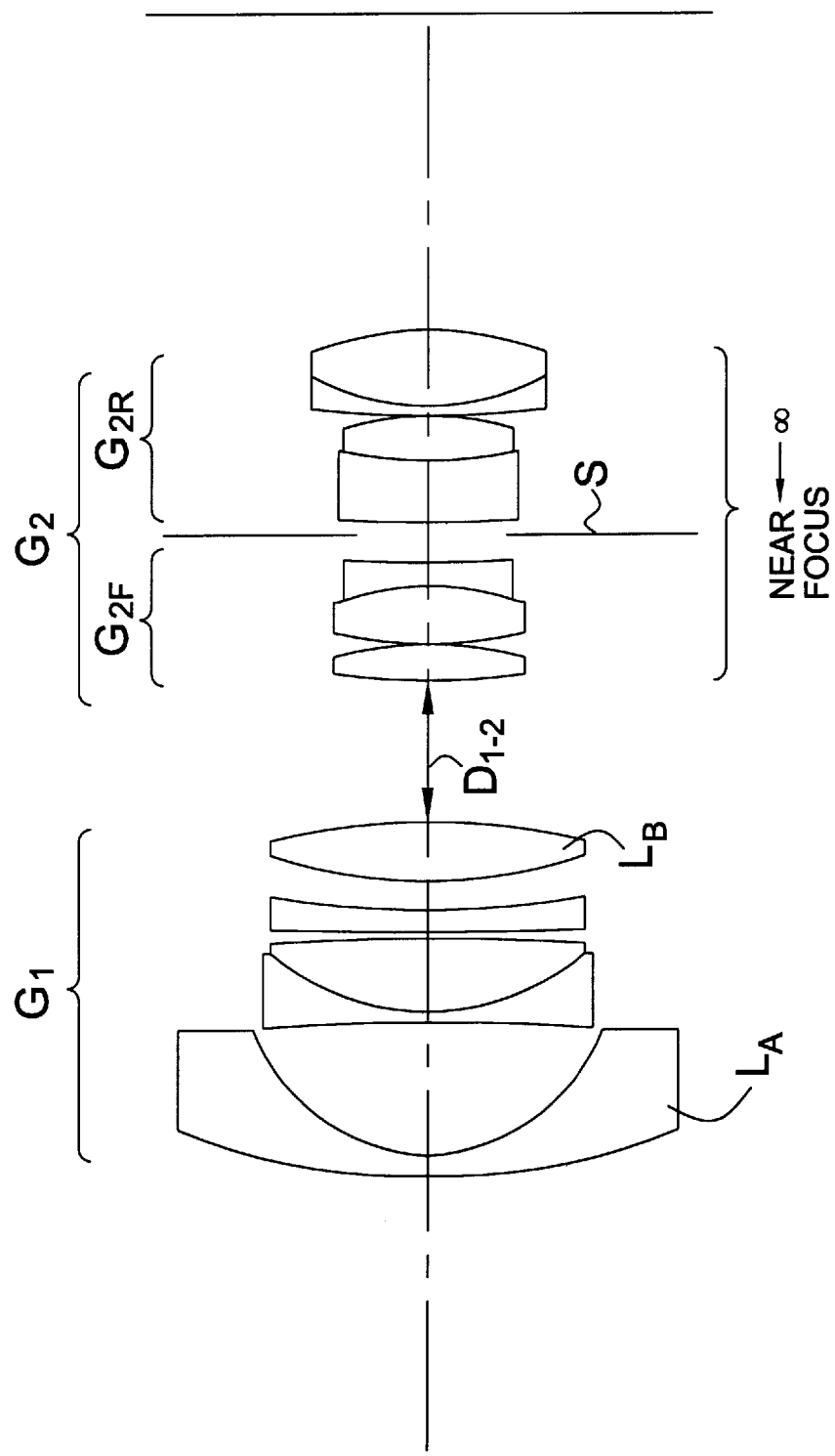
FIG. 20 is a side schematic view of a lens according to a seventh embodiment of the invention.
Figure 24:
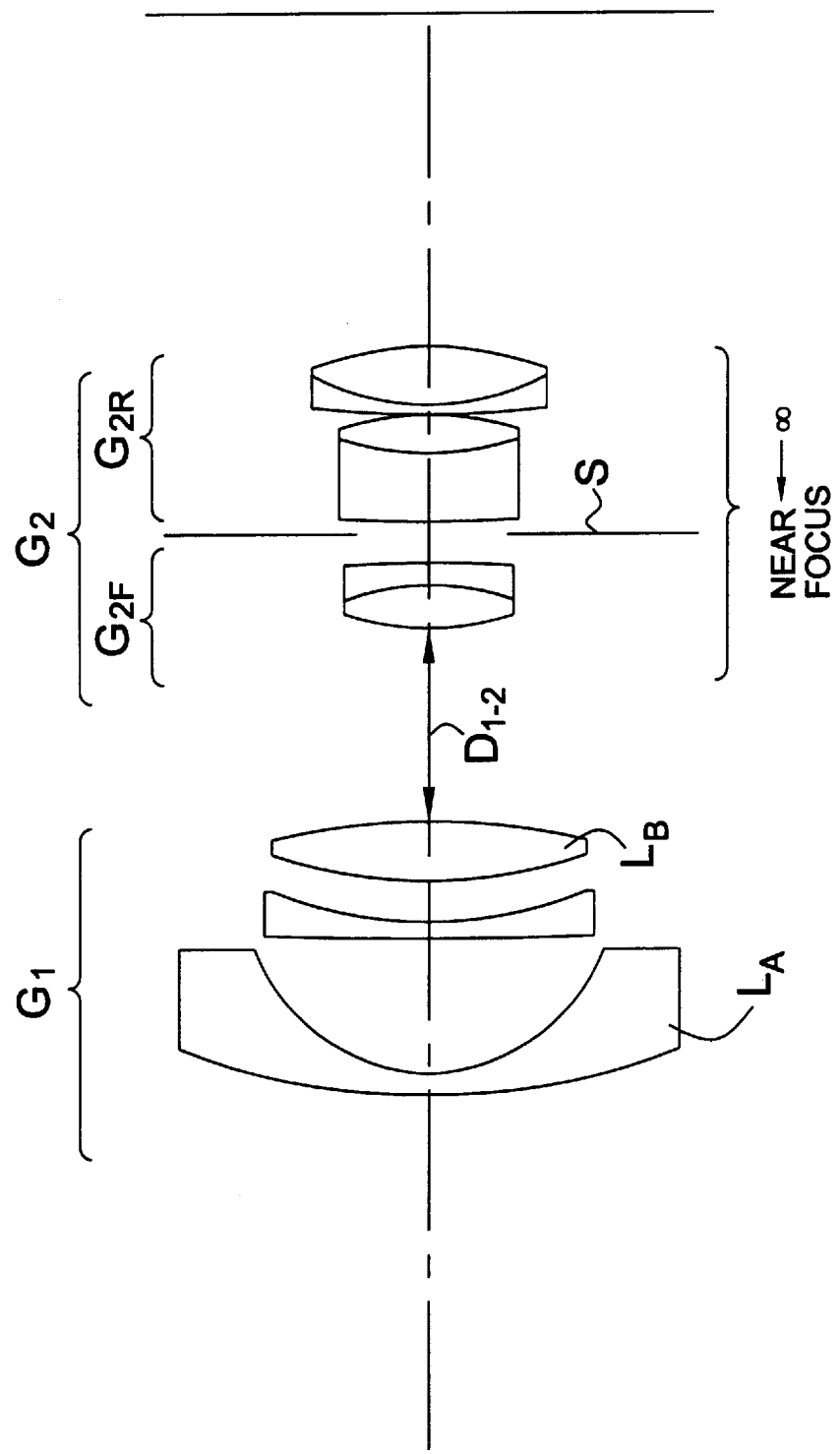
FIG. 24 is a side schematic view of a lens according to an eighth embodiment.
Figure 28:
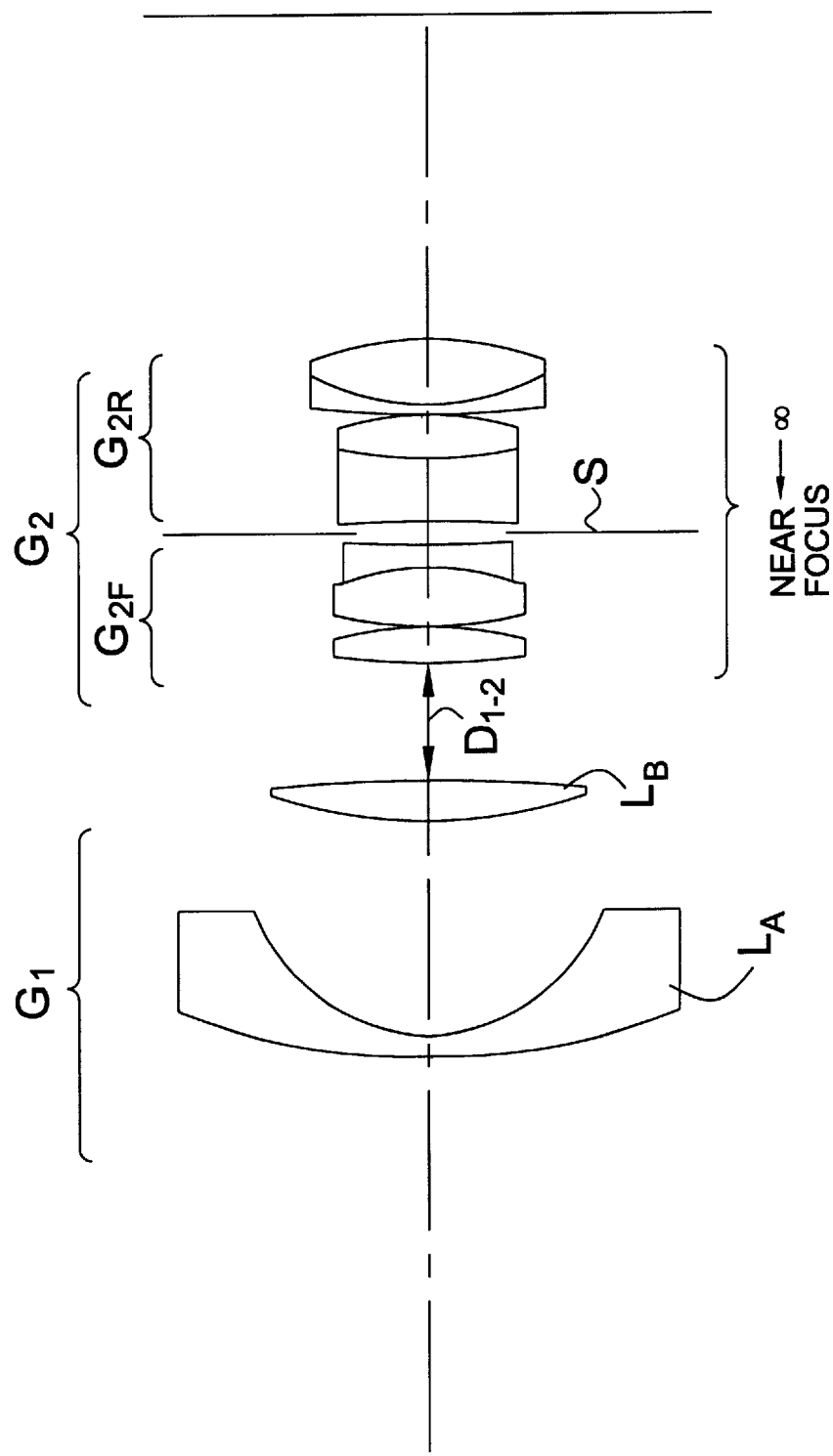
FIG. 28 is a side schematic view of a lens according to a ninth embodiment of the invention.

Preferred embodiments of the invention are described hereafter with respect to the drawings. In the drawings, FIGS. 1, 4, 7, 10, 13, 16, 20, 24 and 28 show lens structures of the retrofocus type according to the invention in the first to the ninth embodiments, respectively. Each embodiment has a first lens group $G_1$ having negative refractive power and a second lens group $G_2$ having positive refractive power from the object side. The first lens group $G_1$ has a negative meniscus lens component $L_A$ having a convex surface facing the object side and a positive lens component $L_B$ positioned more towards the image than the negative meniscus lens component $L_A$. At least one surface of one lens of the first lens group $G_1$ has the form of an aspheric surface. When focusing from an infinite point to a near point, focusing is accomplished by moving the second lens group $G_2$. More preferably, the second lens group $G_2$ has front group $G_{2F}$ having positive refractive power and a rear group $G_{2R}$ having positive refractive power from the object side. In this retrofocus type lens, when focusing from an infinite point to a near point, focusing is accomplished by moving the front group $G_{2F}$ and the rear group $G_{2R}$ of the second lens group toward the object with different amounts of movement.

Parameters for the entire section, lens parameters, aspheric data, and focusing data for the first to the ninth embodiments are shown in the following Tables 1–5 and 7–10. In each table: a symbol f indicates a focal length of the total system; a symbol $F_{NO}$ indicates a F number; and a symbol 2ω indicates an angle of view. In the lens parameter section of each table: the first column shows lens surface numbers starting from the object side; the second column r shows the radius of curvature of each lens surface; the third column d shows a distance between centers of the lens surfaces; the fourth column $v_d$ shows the Abbe numbers standardizing d lines (λ=587.6 nm); and the fifth column $n_d$ shows refractivity at the d line. For certain lens parameters, the corresponding d value is given simply as $d_n$, where n is a lens surface number. For those d values, one should refer to the focusing data, which gives the values for four focusing positions.

Lens surfaces with * marks attached to the lens surface number indicate aspheric surfaces. The curvature radius r for each aspheric lens surface indicate the curvature radius at a top of each aspheric surface. Any aspheric surface has a rotational symmetry represented by the following equation:

$$x = \frac{C_0 y^2}{1 + \sqrt{1 - kC_0^2 y^2}} + \sum_{i=2}^{5} C_{2i} y^{2i}$$

where:

x=A distance measured in a direction of an optical axis from the top of the aspheric surface;

y=A height from the optical axis that passes through the top of the aspheric surface;

$C_0=1/r$ (r=curvature radius of the top of the aspheric surface)

k=cone constant; and $C_4, C_6, C_8, C_{10}$=Aspheric surface coefficients in the fourth to tenth powers.

For the aspheric surface data in each table, the first column shows lens surface numbers of the aspherical surface; the second column k shows cone constants; the third column $C_4$, $C_6$, $C_8$, and $C_{10}$, show the aspheric surface coefficients.

For the focusing data in each table, a symbol $f/\beta$ indicates a focal length or a transverse magnification; a symbol $D_0$ indicates a distance to the object point; a symbol $D_{1-2}$ indicates a variable space between the first lens group $G_1$ and the second lens group $G_2$; and a symbol Bf indicates back focus.

Values for the parameters of Conditions (1) to (9) in embodiments 1–5 are shown in Table 6. For values of parameter $X_R/X_F$, in Condition (1), the top level are the most appropriate values, and the middle and the bottom levels show the upper limit and the lower limit of a usable range, respectively. That is, if focusing is accomplished while maintaining the parameters $X_R/X_F$ in a range between the middle and the bottom levels, sufficient performance in practice can be obtained. Each embodiment is created with values shown in the tables as the most appropriate values. With respect to condition (9), the values for the parameters $n_n-n_p$ of Condition (9) show the values for the cemented lenses existing from the object side among those in the second lens group $G_2$. Hence, there are two or three values in order to show that all of the doublets satisfy condition (9).

Table 11 shows, for embodiments 6–9, values for the parameters of Conditions (3) to (9). Similar to Table 6, the values for parameter $n_n-n_p$ of Condition (9) indicate the values of the cemented lens existing from the object side in the second lens group $G_2$. Hence, there are three values to show that all of the doublets satisfy condition (9).

TABLE 1

First Embodiment
Lens Parameters for the Entire Section
f = 1.0, $F_{NO}$ = F2.9, 2ω = 105.2°

Lens Parameters

| No | r | d | $\upsilon_d$ | $n_d$ |
|---|---|---|---|---|
| 1 | 3.4449 | 0.1277 | 45.37 | 1.796681 |
| 2* | 0.7977 | 0.8262 | | |
| 3 | −12.8834 | 0.1352 | 45.37 | 1.796681 |
| 4 | 2.0286 | 0.1803 | | |
| 5 | 8.2106 | 0.1202 | 40.90 | 1.796310 |
| 6 | 1.7841 | 0.3380 | 64.10 | 1.516800 |
| 7 | 14.9093 | 0.0300 | | |

TABLE 1-continued

First Embodiment
Lens Parameters for the Entire Section
f = 1.0, $F_{NO}$ = F2.9, 2ω = 105.2°

| 8 | 2.9398 | 0.3755 | 25.50 | 1.804581 |
|---|---|---|---|---|
| 9 | −3.3167 | $d_o$ | | |
| 10 | −8.1707 | 0.1652 | 70.41 | 1.487490 |
| 11 | −1.7803 | 0.0075 | | |
| 12 | 1.4924 | 0.3380 | 70.41 | 1.487490 |
| 13 | −1.2891 | 0.3380 | 43.35 | 1.840421 |
| 14 | 5.9201 | $d_{14}$ | | |
| 15 | stop | 0.0751 | | |
| 16 | 5.0476 | 0.3755 | 45.37 | 1.796681 |
| 17 | 1.3988 | 0.3004 | 58.90 | 1.518230 |
| 18 | −1.4377 | 0.0075 | | |
| 19 | 4.5811 | 0.0976 | 37.17 | 1.834000 |
| 20 | 0.9899 | 0.3004 | 70.41 | 1.487490 |
| 21 | −2.4444 | Bf | | |

Aspheric Data

| No | k | | |
|---|---|---|---|
| 2 | 0.4926 | $C_4$ | −1.78960 × 10⁻² |
| | | $C_6$ | −5.57030 × 10⁻² |
| | | $C_8$ | 6.61130 × 10⁻² |
| | | $C_{10}$ | −5.67510 × 10⁻² |

Focusing Data

| | Position 1 | Position 2 | Position 3 | Position 4 |
|---|---|---|---|---|
| f/β | 1.00000 | −0.02500 | −0.08900 | −0.24080 |
| $D_0$ | ∞ | 39.0239 | 10.7332 | 3.2224 |
| $d_o(D_{1-2})$ | 0.77340 | 0.75700 | 0.71697 | 0.61171 |
| $d_{14}$ | 0.21478 | 0.20330 | 0.17528 | 0.10160 |
| Bf | 2.32808 | 2.35621 | 2.42713 | 2.62943 |

TABLE 2

Second Embodiment
Parameters for the Entire Section
f = 1.0, $F_{NO}$ = F2.9, 2ω = 105.2°

Lens Parameters

| No | r | d | $\upsilon_d$ | $n_d$ |
|---|---|---|---|---|
| 1 | 2.9737 | 0.1269 | 43.35 | 1.840421 |
| 2* | 0.8305 | 0.8209 | | |
| 3 | −13.6526 | 0.1343 | 49.45 | 1.772789 |
| 4 | 3.0658 | 0.2090 | | |
| 5 | 30.6872 | 0.1194 | 45.37 | 1.796681 |
| 6 | 1.4953 | 0.3358 | 64.10 | 1.516800 |
| 7 | 5.2720 | 0.0075 | | |
| 8 | 2.4823 | 0.3731 | 28.56 | 1.795040 |
| 9 | −3.3030 | $d_o$ | | |
| 10 | −5.3075 | 0.1642 | 70.41 | 1.487490 |
| 11 | −1.7553 | 0.0075 | | |
| 12 | 1.4454 | 0.3731 | 70.41 | 1.487490 |
| 13 | −1.1881 | 0.1493 | 45.37 | 1.796681 |
| 14 | 5.9495 | $d_{14}$ | | |
| 15 | stop | 0.0746 | | |
| 16 | 4.4468 | 0.4478 | 43.35 | 1.840421 |
| 17 | 2.2993 | 0.0597 | | |
| 18 | 6.8178 | 0.2090 | 58.90 | 1.518230 |
| 19 | −1.4444 | 0.0075 | | |
| 20 | 4.4145 | 0.0746 | 33.89 | 1.803840 |
| 21 | 1.1016 | 0.4030 | 70.41 | 1.487490 |
| 22 | −2.4640 | Bf | | |

Aspheric Data

| No | k | | |
|---|---|---|---|
| 2 | 0.4451 | $C_4$ | 4.31320 × 10⁻³ |
| | | $C_6$ | 2.25420 × 10⁻² |
| | | $C_8$ | −3.95210 × 10⁻² |
| | | $C_{10}$ | 3.54450 × 10⁻² |

TABLE 2-continued

Second Embodiment
Parameters for the Entire Section
$f = 1.0$, $F_{NO} = F2.9$, $2\omega = 105.2°$ Focusing Data

|  | Position 1 | Position 2 | Position 3 | Position 4 |
|---|---|---|---|---|
| $f/\beta$ | 1.00000 | -0.02500 | -0.08900 | -0.24295 |
| $D_0$ | ∞ | 38.9426 | 10.5640 | 3.1013 |
| $d_0(D_{1-2})$ | 1.01422 | 1.00049 | 0.96666 | 0.87825 |
| $d_{14}$ | 0.24836 | 0.23462 | 0.20080 | 0.11239 |
| Bf | 2.31267 | 2.34040 | 2.41084 | 2.61036 |

TABLE 3

Third Embodiment
Parameters for the Entire Section
$f = 1.0$, $F_{NO} = F3.50$, $2\omega = 105.8°$ Lens Parameters

| No | r | d | $\nu_d$ | $n_d$ |
|---|---|---|---|---|
| 1 | 3.2706 | 0.1269 | 43.35 | 1.840421 |
| 2* | 0.7073 | 0.7463 | | |
| 3 | -4.9654 | 0.1194 | 46.54 | 1.804109 |
| 4 | 1.0339 | 0.4478 | 64.10 | 1.516800 |
| 5 | -9.0659 | 0.0384 | | |
| 6 | 178.7856 | 0.1343 | 49.45 | 1.772789 |
| 7 | 4.0967 | 0.2228 | | |
| 8 | 2.4144 | 0.3358 | 28.56 | 1.795040 |
| 9 | -4.1672 | $d_9$ | | |
| 10 | 3.7092 | 0.1642 | 65.77 | 1.464500 |
| 11 | -2.1747 | 0.0075 | | |
| 12 | 1.6014 | 0.3731 | 65.77 | 1.464500 |
| 13 | -1.2749 | 0.1493 | 43.35 | 1.840421 |
| 14 | 37.3311 | $d_{14}$ | | |
| 15 | stop | 0.1119 | | |
| 16 | 7.1753 | 0.3731 | 43.35 | 1.840421 |
| 17 | 1.0679 | 0.2985 | 58.90 | 1.518230 |
| 18 | -1.5358 | 0.0075 | | |
| 19 | -25.2282 | 0.0746 | 33.86 | 1.803840 |
| 20 | 0.9805 | 0.4030 | 70.41 | 1.487490 |
| 21 | -1.5409 | Bf | | |

Aspheric Data

| No | k | | |
|---|---|---|---|
| 2 | 0.4763 | $C_4$ | $-8.93630 \times 10^{-2}$ |
| | | $C_6$ | $4.70920 \times 10^{-2}$ |
| | | $C_8$ | $-6.22020 \times 10^{-2}$ |
| | | $C_{10}$ | $-9.45760 \times 10^{-2}$ |

Focusing Data

|  | Position 1 | Position 2 | Position 3 |
|---|---|---|---|
| $f/\beta$ | 1.00000 | -0.02500 | -0.10000 |
| $D_n$ | ∞ | 39.5977 | 9.6147 |
| $d_9(D_{1-2})$ | 0.74209 | 0.71751 | 0.64273 |
| $d_{14}$ | 0.14925 | 0.13696 | 0.09957 |
| Bf | 2.30931 | 2.34617 | 2.45835 |

TABLE 4

Fourth Embodiment
Parameters for the Entire Section
$f = 1.0$, $F_{NO} = F2.87$, $2\omega = 105.5°$ Lens Parameters

| No | r | d | $\nu_d$ | $n_d$ |
|---|---|---|---|---|
| 1 | 10.1795 | 0.1269 | 45.37 | 1.796681 |

TABLE 4-continued

Fourth Embodiment
Parameters for the Entire Section
$f = 1.0$, $F_{NO} = F2.87$, $2\omega = 105.5°$

| No | r | d | $\nu_d$ | $n_d$ |
|---|---|---|---|---|
| 2* | 0.7688 | 0.7463 | | |
| 3 | 5.5736 | 0.1343 | 49.45 | 1.772789 |
| 4 | 2.0069 | 0.2353 | | |
| 5 | 2.1049 | 0.4104 | 28.56 | 1.795040 |
| 6 | -6.5537 | $d_6$ | | |
| 7 | 1.3145 | 0.3511 | 65.77 | 1.464500 |
| 8 | -1.0293 | 0.1088 | 45.37 | 1.796681 |
| 9 | -9.8784 | $d_9$ | | |
| 10 | stop | 0.1000 | | |
| 11 | 7.4363 | 0.3723 | 45.37 | 1.796681 |
| 12 | 1.2189 | 0.2985 | 58.90 | 1.518230 |
| 13 | -1.4851 | 0.0075 | | |
| 14 | 3.0371 | 0.0746 | 33.89 | 1.803840 |
| 15 | 1.1072 | 0.3298 | 70.41 | 1.487490 |
| 16 | -2.4042 | Bf | | |

Aspheric Data

| No | k | | |
|---|---|---|---|
| 2 | 0.3347 | $C_4$ | $-8.18250 \times 10^{-2}$ |
| | | $C_6$ | $-1.98560 \times 10^{-2}$ |
| | | $C_8$ | $-6.12160 \times 10^{-3}$ |
| | | $C_{10}$ | $-1.14270 \times 10^{-2}$ |

Focusing Data

|  | Position 1 | Position 2 | Position 3 |
|---|---|---|---|
| $f/\beta$ | 1.00000 | -0.02500 | -0.10000 |
| $D_n$ | ∞ | 39.4722 | 9.4891 |
| $d_6(D_{1-2})$ | 1.13372 | 1.12045 | 1.08026 |
| $d_9$ | 0.16119 | 0.14792 | 0.10773 |
| Bf | 2.31330 | 2.33984 | 2.42021 |

TABLE 5

Fifth Embodiment
Parameters for the Entire Section
$f = 1.0$, $F_{NO} = F2.89$, $2\omega = 94.9°$ Lens Parameters

| No | r | d | $\nu_d$ | $n_d$ |
|---|---|---|---|---|
| 1 | 27.6121 | 0.1062 | 43.35 | 1.840421 |
| 2* | 0.7047 | 0.9374 | | |
| 3 | 3.0865 | 0.2188 | 23.01 | 1.860741 |
| 4 | -12.0267 | $d_4$ | | |
| 5 | 2.7473 | 0.2188 | 65.77 | 1.464500 |
| 6 | -1.9382 | 0.0063 | | |
| 7 | 1.1586 | 0.3438 | 65.77 | 1.464500 |
| 8 | -0.9912 | 0.1250 | 45.37 | 1.796681 |
| 9 | 2.5041 | $d_9$ | | |
| 10 | stop | 0.0938 | | |
| 11 | -3.9371 | 0.3125 | 45.37 | 1.796681 |
| 12 | 1.3819 | 0.2500 | 64.10 | 1.516800 |
| 13 | -0.9759 | 0.0063 | | |
| 14 | 3.0386 | 0.0625 | 33.89 | 1.803840 |
| 15 | 0.9629 | 0.3375 | 70.41 | 1.487490 |
| 16 | -1.5346 | Bf | | |

Aspheric Data

| No | k | | |
|---|---|---|---|
| 2 | 0.1612 | $C_4$ | $-9.64400 \times 10^{-2}$ |
| | | $C_6$ | $4.59470 \times 10^{-2}$ |
| | | $C_8$ | $-8.17730 \times 10^{-2}$ |
| | | $C_{10}$ | $6.66720 \times 10^{-2}$ |

Focusing Data

|  | Position 1 | Position 2 | Position 3 |
|---|---|---|---|
| $f/\beta$ | 1.00000 | -0.02500 | -0.10000 |

TABLE 5-continued

Fifth Embodiment
Parameters for the Entire Section
$f = 1.0$, $F_{NO} = F2.89$, $2\omega = 94.9°$

| $D_n$ | $\infty$ | 39.3527 | 9.3881 |
|---|---|---|---|
| $d_4(D_{1-2})$ | 0.56265 | 0.54335 | 0.48458 |
| $d_9$ | 0.12500 | 0.11535 | 0.08597 |
| Bf | 1.93777 | 1.96694 | 2.05842 |

TABLE 6

Cumulative Condition Values for First–Fifth Embodiments

| Embodiment Number | 1 | 2 | 3 | 4 | 5 |
|---|---|---|---|---|---|
| (1) $X_O/X_F$ | 1.6 | 1.84 | 1.5 | 2.0 | 1.5 |
| Lower Limit in the Usable Range | 1.3 | 1.5 | 1.3 | 1.6 | 1.2 |
| Upper Limit in the Usable Range | 2.0 | 2.3 | 2.1 | 2.5 | 2.0 |
| (2) $f_{2g}/f_{2F}$ | 0.540 | 0.540 | 2.538 | 0.324 | 0.654 |
| (3) $|f_1|/f_2$ | 1.048 | 1.048 | 0.873 | 1.374 | 1.198 |
| (4) $D_{1-2}/f$ | 0.773 | 1.014 | 0.742 | 1.134 | 0.563 |
| (5) $f_2/f$ | 2.365 | 2.350 | 2.477 | 2.173 | 1.968 |
| (6) $f_4/f_1$ | 0.537 | 0.572 | 0.508 | 0.352 | 0.366 |
| (7) $\nu_d$ | 25.50 | 28.56 | 28.56 | 28.56 | 23.01 |
| (8) $f_8/|f_{11}|$ | 0.803 | 0.745 | 0.909 | 0.686 | 1.219 |
| (9) $n_n-n_p$ | 0.353 | 0.309 | 0.376 | 0.332 | 0.332 |
| | 0.278 | 0.316 | 0.322 | 0.279 | 0.280 |
| | 0.347 | | 0.316 | 0.316 | 0.316 |

TABLE 7

Sixth Embodiment
Parameters for the Entire Section
$f = 1.0$, $F_{NO} = F2.88$, $2\omega = 105.4°$

| No. | r | d | $\nu_d$ | $n_d$ |
|---|---|---|---|---|
| | Lens Parameter | | | |
| 1 | 3.0760 | 0.1269 | 45.37 | 1.796681 |
| 2* | 0.7254 | 0.7463 | | |
| 3 | 24.8524 | 0.1343 | 49.45 | 1.772789 |
| 4 | 2.6170 | 0.2239 | | |
| 5 | -12.5136 | 0.1194 | 46.54 | 1.804109 |
| 6 | 1.3827 | 0.3731 | 64.10 | 1.516800 |
| 7 | 94.9470 | 0.0075 | | |
| 8 | 2.1886 | 0.3358 | 28.56 | 1.795040 |
| 9 | -4.1489 | $d_o$ | | |
| 10 | 18.3774 | 0.1642 | 65.77 | 1.464500 |
| 11 | -2.5065 | 0.0075 | | |
| 12 | 1.3969 | 0.3731 | 65.77 | 1.464500 |
| 13 | -1.2591 | 0.1493 | 45.37 | 1.796681 |
| 14 | 5.1811 | 0.1493 | | |
| 15 | stop | 0.1119 | | |
| 16 | 5.2047 | 0.3731 | 45.37 | 1.796681 |
| 17 | 1.4335 | 0.2985 | 58.90 | 1.518230 |
| 18 | -1.6205 | 0.0075 | | |
| 19 | 4.0487 | 0.0746 | 33.89 | 1.803840 |
| 20 | 0.9718 | 0.4030 | 70.41 | 1.487490 |
| 21 | -2.3739 | Bf | | |

Aspheric Data

| No | k | | |
|---|---|---|---|
| 2 | 0.4652 | $C_4$ | $-2.23910 \times 10^{-2}$ |
| | | $C_6$ | $1.07920 \times 10^{-2}$ |
| | | $C_8$ | $7.08100 \times 10^{-3}$ |
| | | $C_{10}$ | $-4.55200 \times 10^{-2}$ |

TABLE 7-continued

Sixth Embodiment
Parameters for the Entire Section
$f = 1.0$, $F_{NO} = F2.88$, $2\omega = 105.4°$

| | Position 1 | Position 2 | Position 3 | Position 4 |
|---|---|---|---|---|
| | Focusing Data | | | |
| $f/\beta$ | 1.00000 | -0.02500 | -0.08900 | -0.24080 |
| $D_0$ | $\infty$ | 39.1645 | 10.8576 | 3.3949 |
| $d_o (D_{1-2})$ | 0.79702 | 0.76690 | 0.69217 | 0.48909 |
| Bf | 2.31321 | 2.34360 | 2.42130 | 2.64850 |

TABLE 8

Seventh Embodiment
Parameters for the Entire Sections
$f = 1.0$, $F_{NO} = F3.5$, $2\omega = 105.8°$

| No | r | d | $\nu_d$ | $n_d$ |
|---|---|---|---|---|
| | Lens Parameter | | | |
| 1 | 3.2706 | 0.1269 | 43.35 | 1.840421 |
| 2* | 0.7073 | 0.7463 | | |
| 3 | -4.9654 | 0.1194 | 46.54 | 1.804109 |
| 4 | 1.0339 | 0.4478 | 64.10 | 1.516800 |
| 5 | -9.0659 | 0.384 | | |
| 6 | 178.7856 | 0.1343 | 49.45 | 1.772789 |
| 7 | 4.0967 | 0.2228 | | |
| 8 | 2.4144 | 0.3358 | 28.56 | 1.795040 |
| 9 | -4.1672 | $d_o$ | | |
| 10 | 3.7092 | 0.1642 | 65.77 | 1.464500 |
| 11 | -2.1747 | 0.0075 | | |
| 12 | 1.6014 | 0.3731 | 65.77 | 1.464500 |
| 13 | -1.2749 | 0.1493 | 43.35 | 1.840421 |
| 14 | 37.3317 | 0.1493 | | |
| 15 | stop | 0.1119 | | |
| 16 | 7.1753 | 0.3731 | 43.35 | 1.840421 |
| 17 | 1.0679 | 0.2985 | 58.90 | 1.518230 |
| 18 | -1.5358 | 0.0075 | | |
| 19 | -25.2282 | 0.0746 | 33.89 | 1.803840 |
| 20 | 0.9805 | 0.4030 | 70.41 | 1.487490 |
| 21 | -1.5409 | Bf | | |

Aspheric Data

| No | k | | |
|---|---|---|---|
| 2 | 0.4763 | $C_4$ | $-8.93630 \times 10^{-2}$ |
| | | $C_6$ | $4.70920 \times 10^{-2}$ |
| | | $C_8$ | $-6.22020 \times 10^{-2}$ |
| | | $C_{10}$ | $-9.45760 \times 10^{-2}$ |

| | Position 1 | Position 2 | Position 3 | Position 4 |
|---|---|---|---|---|
| | Focusing Data | | | |
| $f/\beta$ | 1.00000 | -0.02500 | -0.09000 | -0.26630 |
| $D_0$ | $\infty$ | 39.2652 | 10.5819 | 3.1192 |
| $d_o (D_{1-2})$ | 0.74209 | 0.71006 | 0.62633 | 0.37081 |
| Bf | 2.30930 | 2.34161 | 2.42865 | 2.71565 |

TABLE 9

Eighth Embodiment
Parameters for the Entire Section
$f = 1.0$, $F_{NO} = F2.87$, $2\omega = 105.6°$

| No | r | d | $\nu_d$ | $n_d$ |
|---|---|---|---|---|
| | Lens Parameter | | | |
| 1 | 10.1795 | 0.1269 | 45.37 | 1.796681 |
| 2* | 0.7688 | 0.7463 | | |
| 3 | 5.5736 | 0.1343 | 49.45 | 1.772789 |

TABLE 9-continued

Eighth Embodiment
Parameters for the Entire Section
f = 1.0, $F_{NO}$ = F2.87, 2ω = 105.6°

| | | | | |
|---|---|---|---|---|
| 4 | 2.0069 | 0.2353 | | |
| 5 | 2.1049 | 0.4104 | 28.56 | 1.795040 |
| 6 | −6.5537 | $d_6$ | | |
| 7 | 1.3145 | 0.3511 | 65.77 | 1.464500 |
| 8 | −1.0293 | 0.1088 | 45.37 | 1.796681 |
| 9 | −9.8784 | 0.0746 | | |
| 10 | stop | 0.1866 | | |
| 11 | 7.4363 | 0.3723 | 45.37 | 1.796681 |
| 12 | 1.2189 | 0.2985 | 58.90 | 1.518230 |
| 13 | −1.4851 | 0.0075 | | |
| 14 | 3.0371 | 0.0746 | 33.89 | 1.803840 |
| 15 | 1.1072 | 0.3298 | 70.41 | 1.487490 |
| 16 | −2.4042 | Bf | | |

Aspheric Data

| No | k | | |
|---|---|---|---|
| 2 | 0.3347 | $C_4$ | −8.18250 × 10$^{-2}$ |
| | | $C_6$ | −1.98560 × 10$^{-2}$ |
| | | $C_8$ | −6.12160 × 10$^{-3}$ |
| | | $C_{10}$ | −1.14270 × 10$^{-2}$ |

| | Position 1 | Position 2 | Position 3 | Position 4 |
|---|---|---|---|---|

Focusing Data

| | | | | |
|---|---|---|---|---|
| f/β | 1.00000 | −0.02500 | −0.08500 | −0.21225 |
| $D_0$ | ∞ | 39.0601 | 11.2967 | 3.8340 |
| $d_6$ ($D_{1-2}$) | 1.13372 | 1.10542 | 1.04001 | 0.88379 |
| Bf | 2.31330 | 2.34192 | 2.41053 | 2.58854 |

TABLE 10

Ninth Embodiment
Parameters for the Entire Section
f = 1.0, $F_{NO}$ = F2.88, 2ω = 94.9°

| No | r | d | $v_d$ | $n_d$ |
|---|---|---|---|---|

Lens Parameter

| | | | | |
|---|---|---|---|---|
| 1 | 27.6121 | 0.1062 | 43.35 | 1.840421 |
| 2* | 0.7047 | 0.9374 | | |
| 3 | 3.0865 | 0.2188 | 23.01 | 1.860741 |
| 4 | −12.0267 | $d_4$ | | |
| 5 | 2.7473 | 0.2188 | 65.77 | 1.464500 |
| 6 | −1.9382 | 0.0063 | | |
| 7 | 1.1586 | 0.3438 | 65.77 | 1.464500 |
| 8 | −0.9912 | 0.1250 | 45.37 | 1.796681 |
| 9 | 2.5041 | 0.1250 | | |
| 10 | stop | 0.0938 | | |
| 11 | −3.9371 | 0.3125 | 45.37 | 1.796681 |
| 12 | 1.3819 | 0.2500 | 64.10 | 1.516800 |
| 13 | −0.9759 | 0.0063 | | |
| 14 | 3.0386 | 0.0625 | 33.89 | 1.803840 |
| 15 | 0.9629 | 0.3375 | 70.41 | 1.487490 |
| 16 | −1.5346 | Bf | | |

Aspheric Data

| No | k | | |
|---|---|---|---|
| 2 | 0.1612 | $C_4$ | −9.64400 × 10$^{-2}$ |
| | | $C_6$ | 4.59470 × 10$^{-2}$ |
| | | $C_8$ | −8.17730 × 10$^{-2}$ |
| | | $C_{10}$ | 6.66720 × 10$^{-2}$ |

| | Position 1 | Position 2 | Position 3 |
|---|---|---|---|

Focusing Data

| | | | |
|---|---|---|---|
| f/β | 1.00000 | −0.02500 | −0.10000 |
| $D_0$ | ∞ | 39.8304 | 9.8783 |

TABLE 10-continued

Ninth Embodiment
Parameters for the Entire Section
f = 1.0, $F_{NO}$ = F2.88, 2ω = 94.9°

| | | | |
|---|---|---|---|
| $d_4$ ($D_{1-2}$) | 0.56265 | 0.53193 | 0.43657 |
| Bf | 1.93777 | 1.96849 | 2.06385 |

TABLE 11

Cumulative Condition Values for Sixth–Ninth Embodiments

| Embodiment Number | 6 | 7 | 8 | 9 |
|---|---|---|---|---|
| (3) $\|f_1\|/f_2$ | 1.048 | 0.873 | 1.374 | 1.198 |
| (4) $D_{1-2}/f$ | 0.797 | 0.742 | 1.134 | 0.563 |
| (5) $f_2/f$ | 2.350 | 2.477 | 2.173 | 1.968 |
| (6) $f_4/f_1$ | 0.496 | 0.508 | 0.352 | 0.366 |
| (7) $v_d$ | 28.56 | 28.56 | 28.56 | 23.01 |
| (8) $f_8/\|f_1\|$ | 0.749 | 0.909 | 0.686 | 1.219 |
| (9) $n_n - n_p$ | 0.332 | 0.376 | 0.332 | 0.332 |
| | 0.279 | 0.322 | 0.278 | 0.280 |
| | 0.316 | 0.316 | 0.316 | 0.316 |

Figure 2:
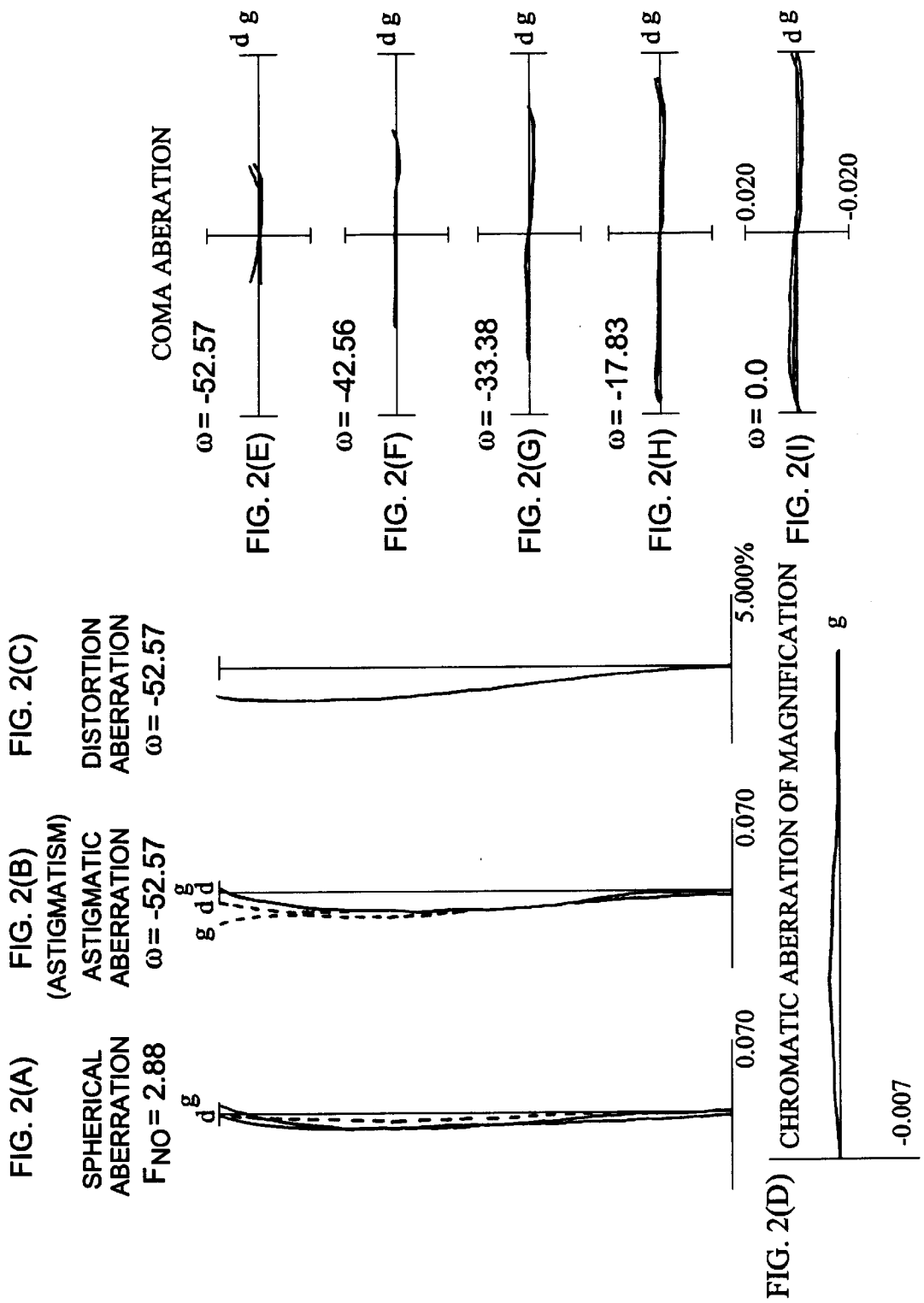
FIGS. 2(A)–(I) are aberrational graphs of the first embodiment ($D_0=\infty$)
Figure 3:
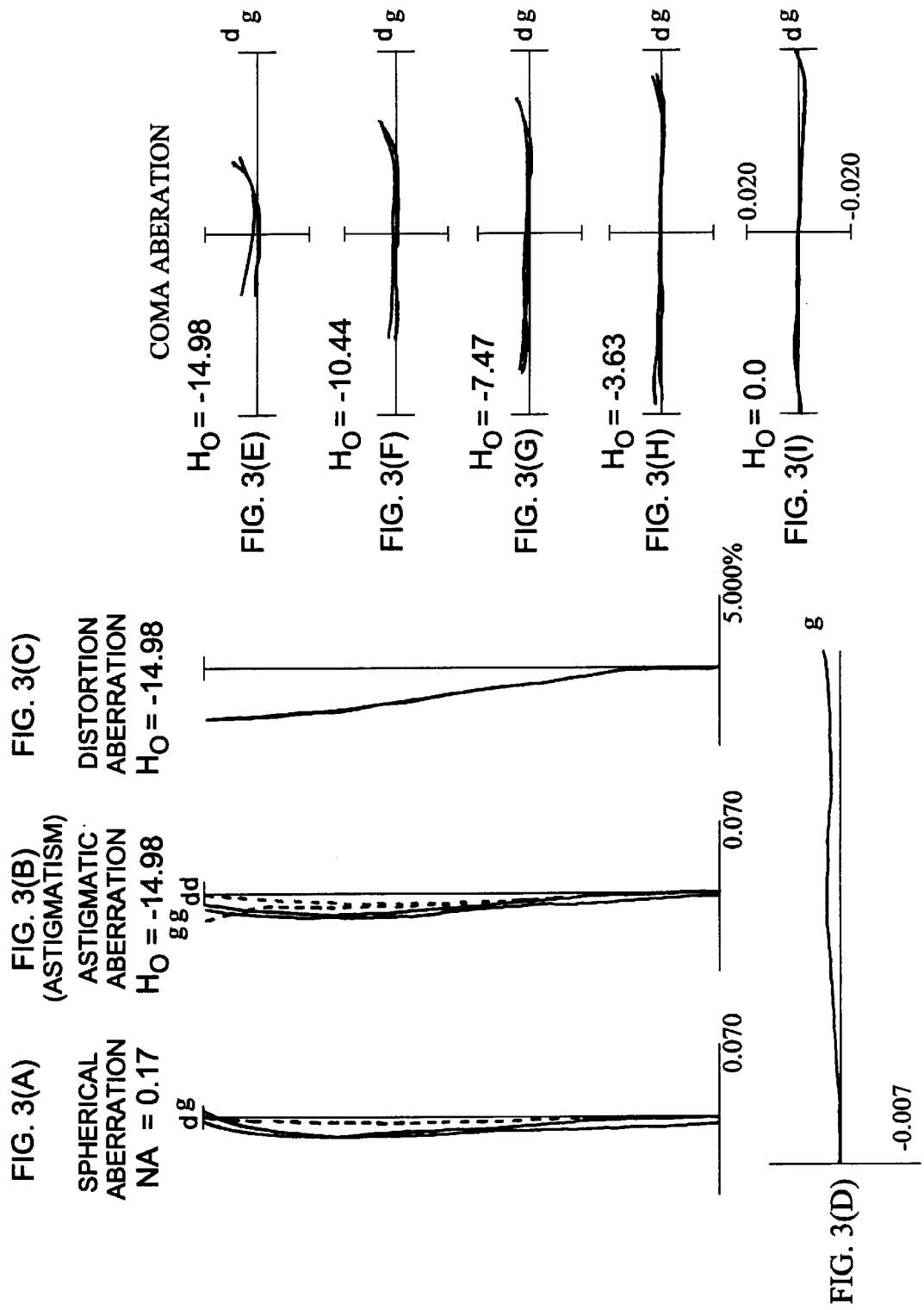
FIGS. 3(A)–(I) are aberrational graphs of the first embodiment ($\beta=-0.089$)
Figure 5:
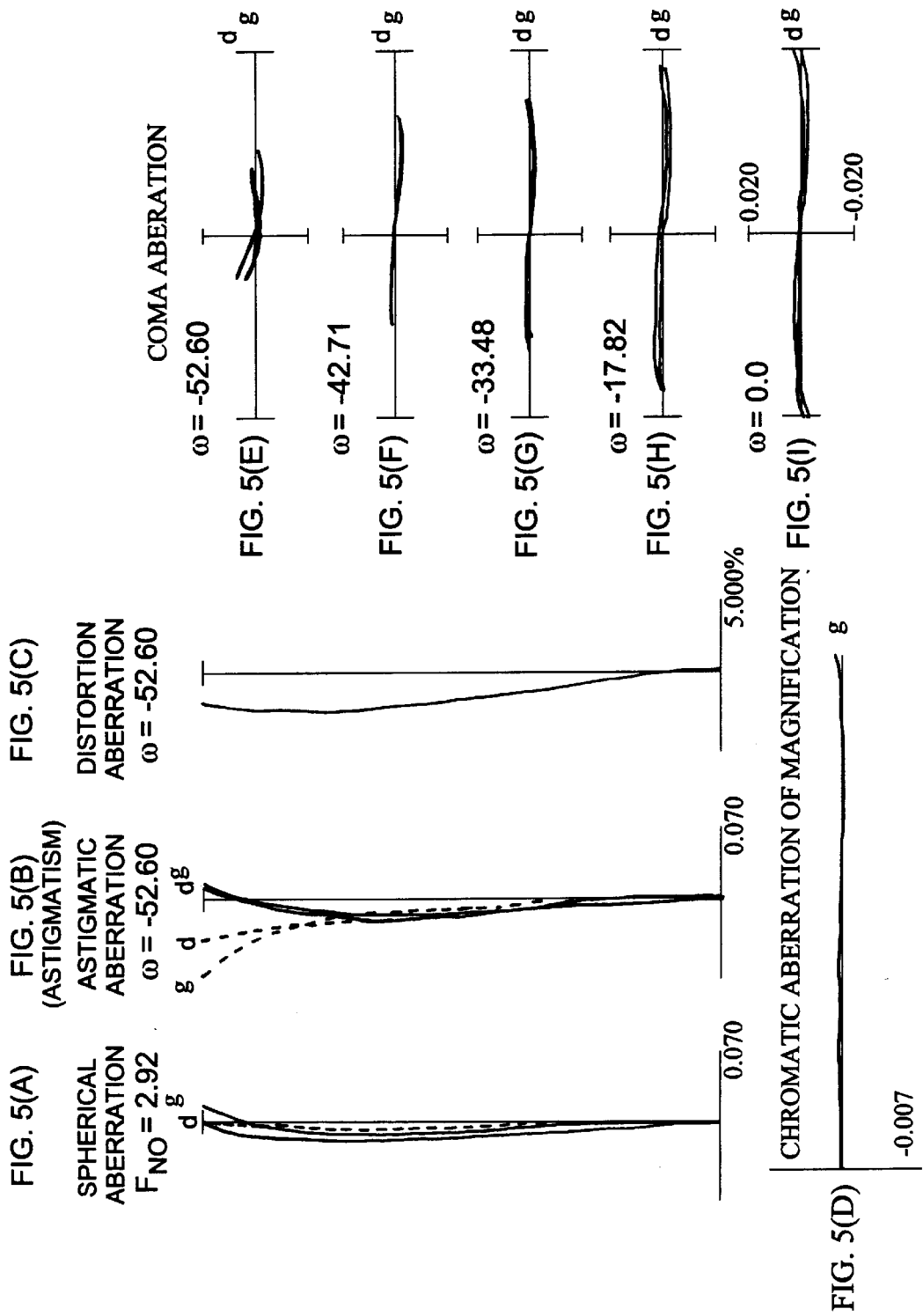
FIGS. 5(A)–(I) are aberrational graphs of the second embodiment ($D_0=\infty$)
Figure 6:
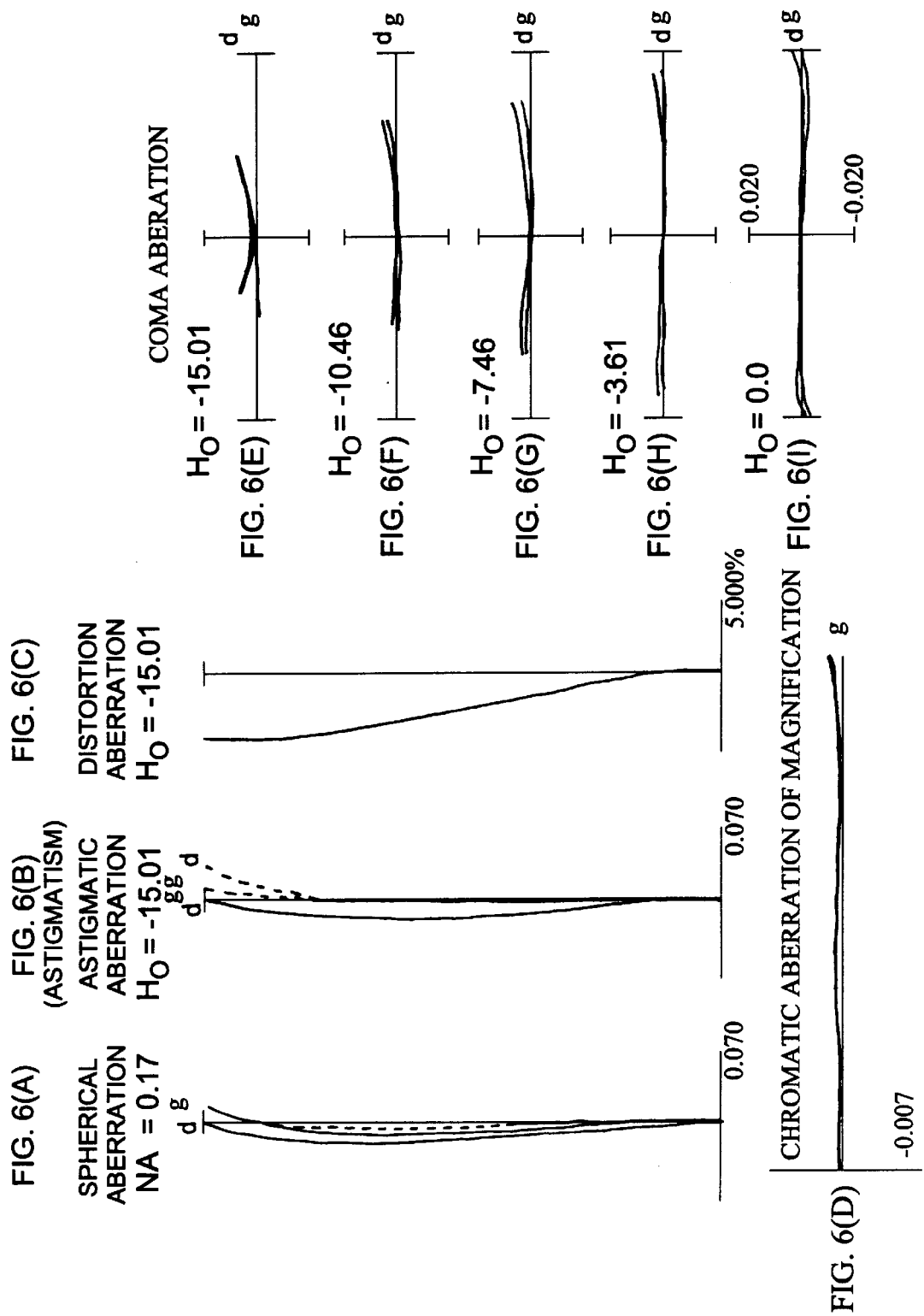
FIGS. 6(A)–(I) are aberrational graphs of the second embodiment ($\beta=-0.089$)
Figure 8:
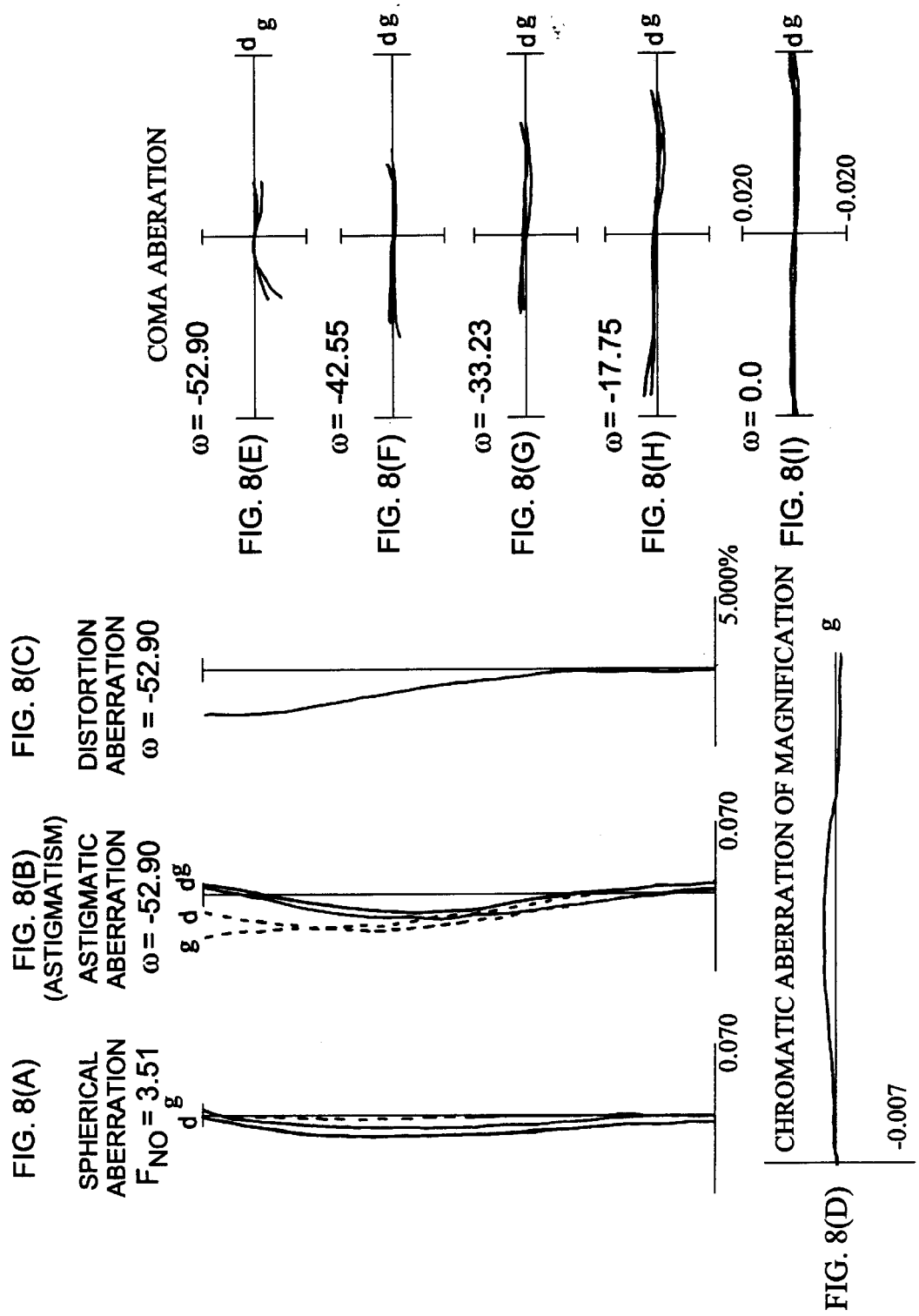
FIGS. 8(A)–(I) are aberrational graphs of the third embodiment ($D_0=\infty$)
Figure 9:
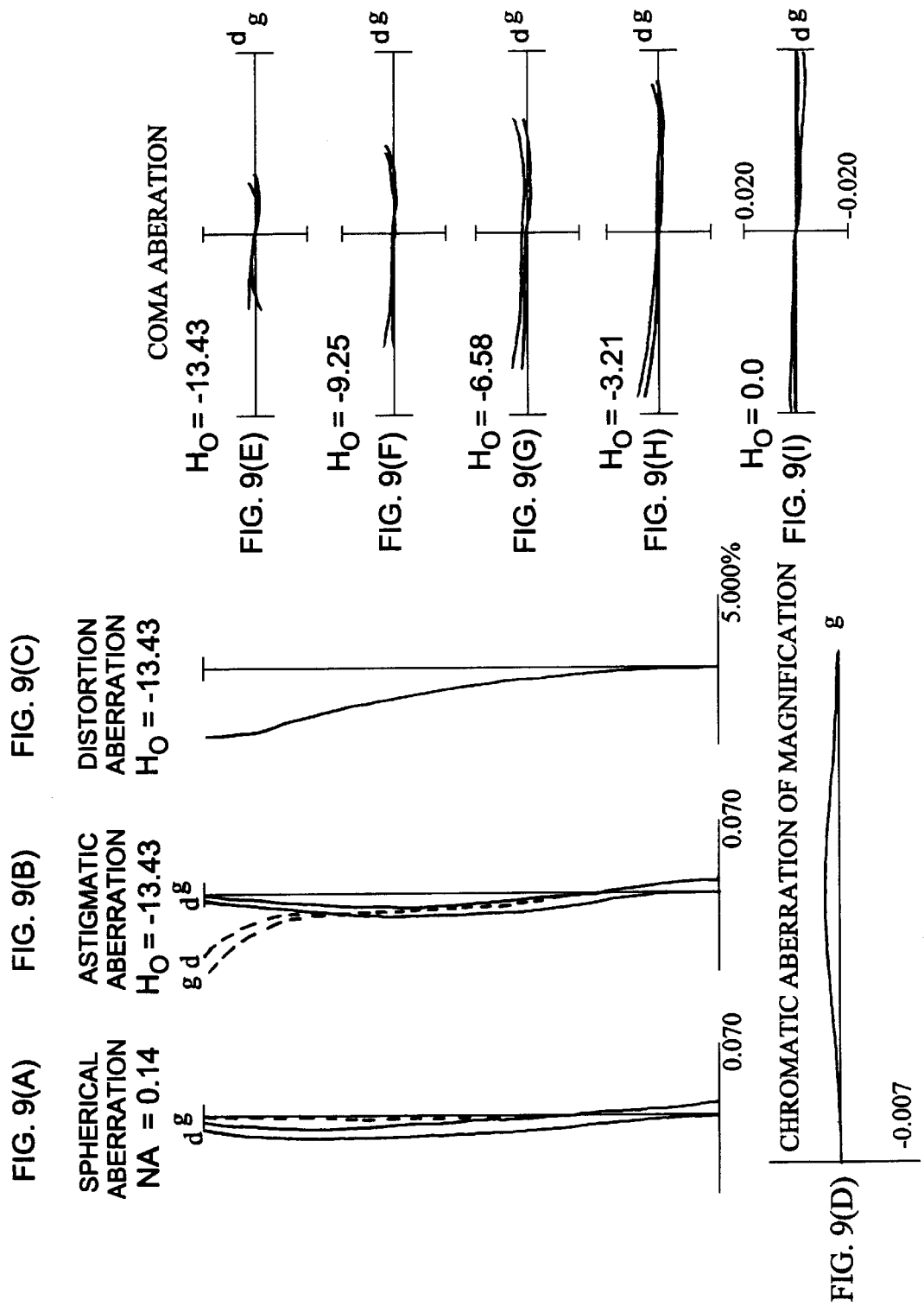
FIGS. 9(A)–(I) are aberrational graphs of the third embodiment ($\beta=-0.1$)
Figure 11:
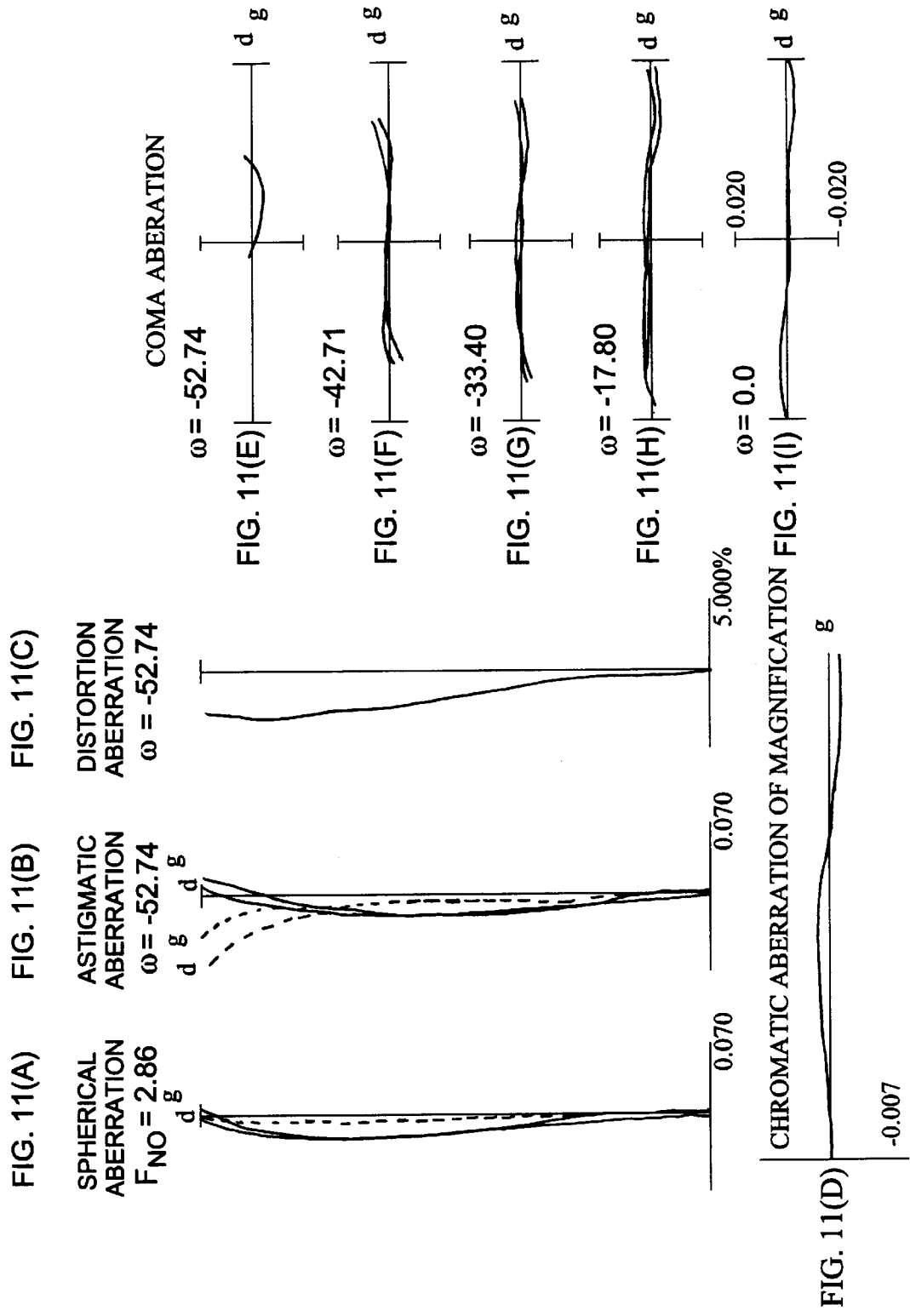
FIGS. 11(A)–(I) are aberrational graphs of the fourth embodiment ($D_0=\infty$)
Figure 12:
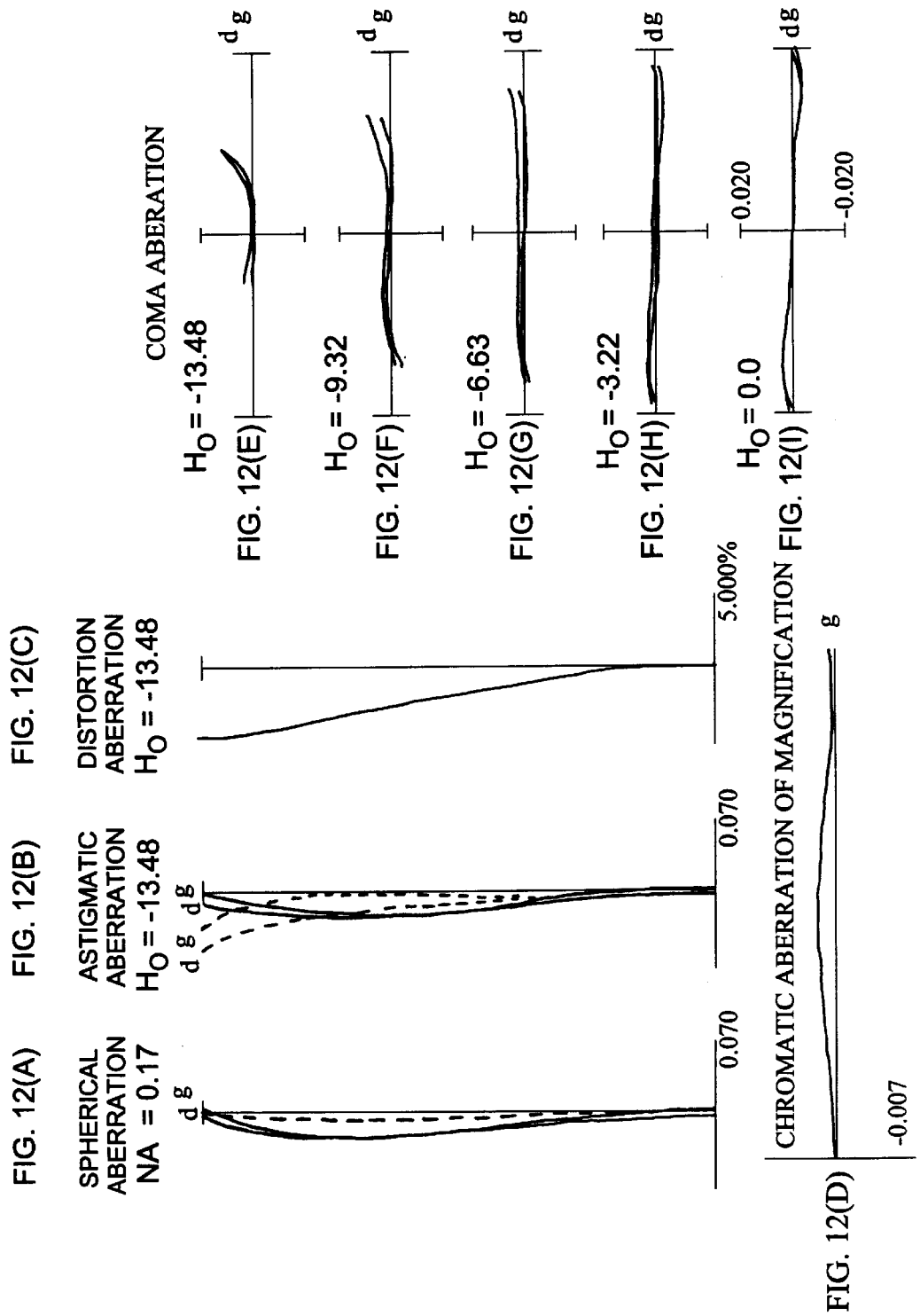
FIGS. 12(A)–(I) are aberrational graphs of the fourth embodiment ($\beta=-0.1$)
Figure 14:
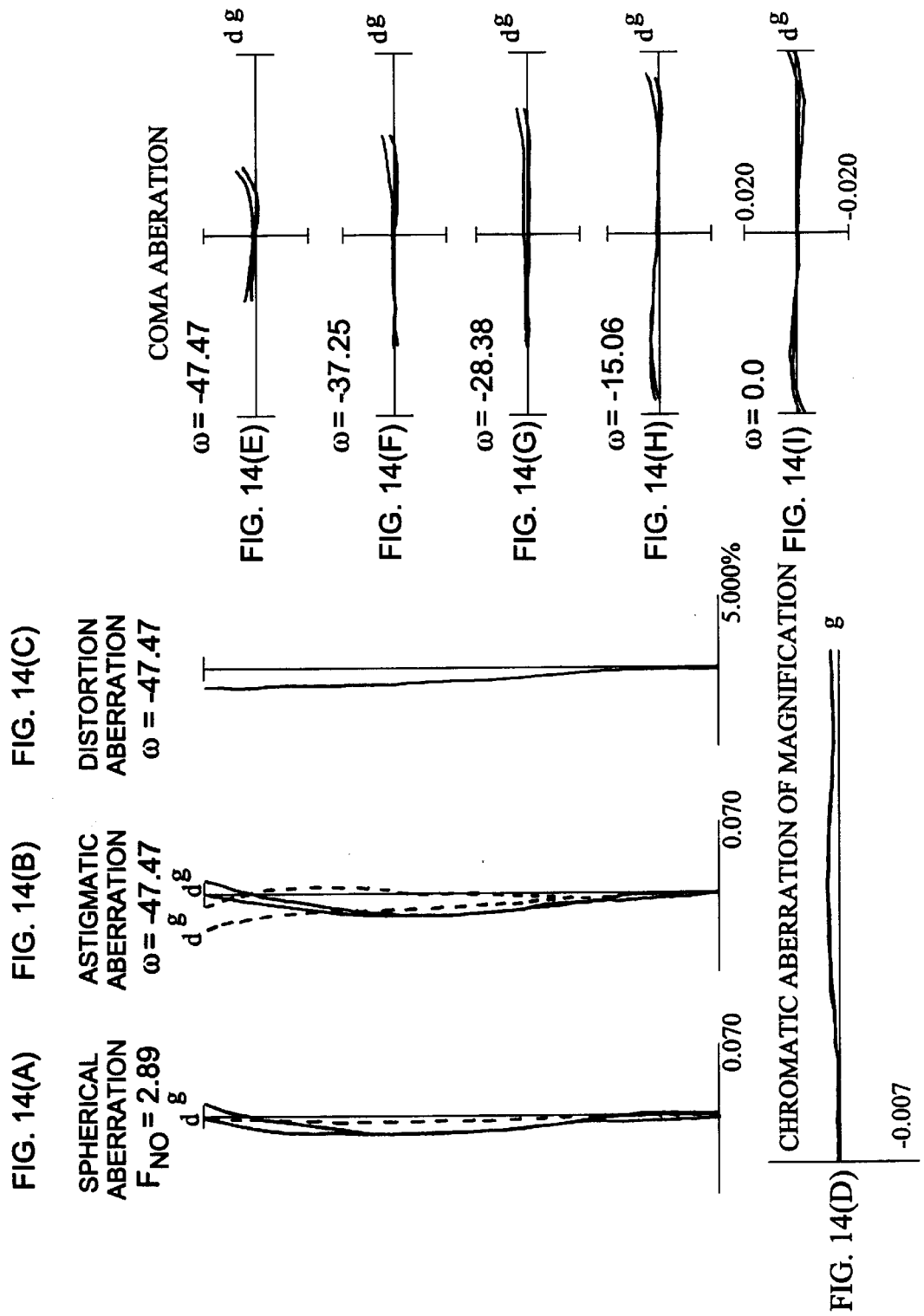
FIGS. 14(A)–(I) are aberrational graphs of the fifth embodiment ($D_0=\infty$)
Figure 15:
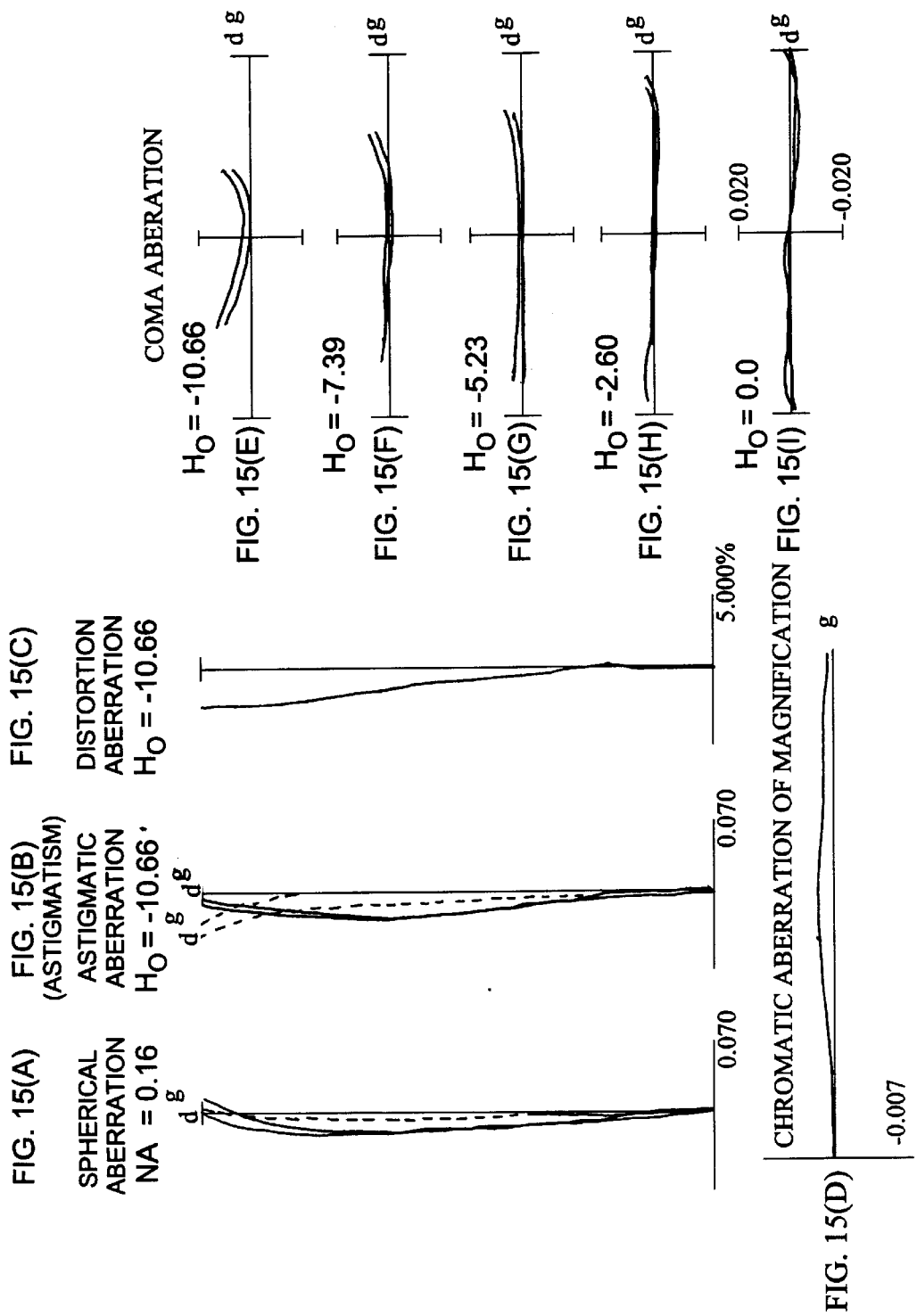
FIGS. 15(A)–(I) are aberrational graphs of the fifth embodiment ($\beta=-0.1$)
Figure 17:
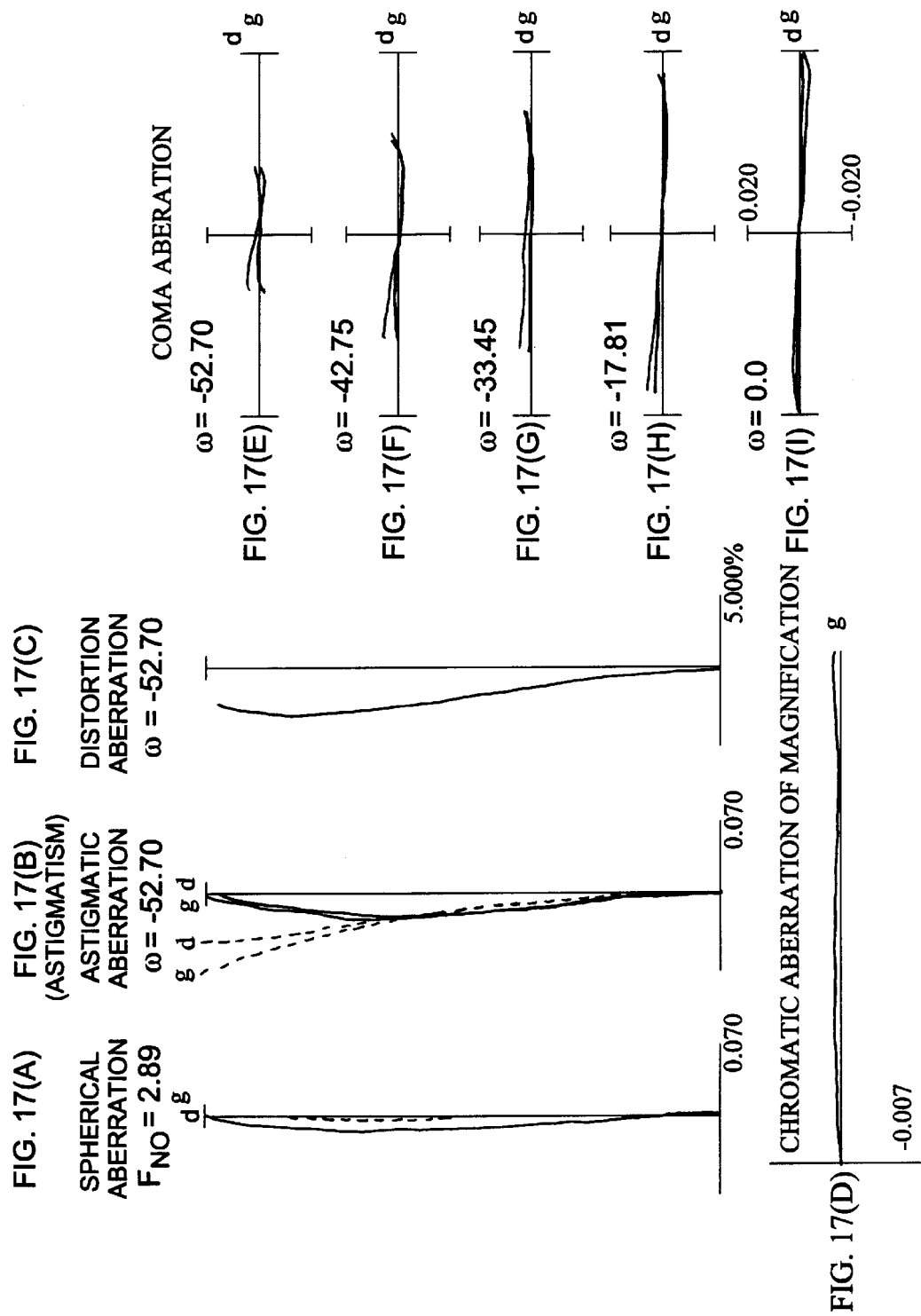
FIGS. 17(A)–(I) are aberrational graphs of the sixth embodiment ($D_0=\infty$)
Figure 18:
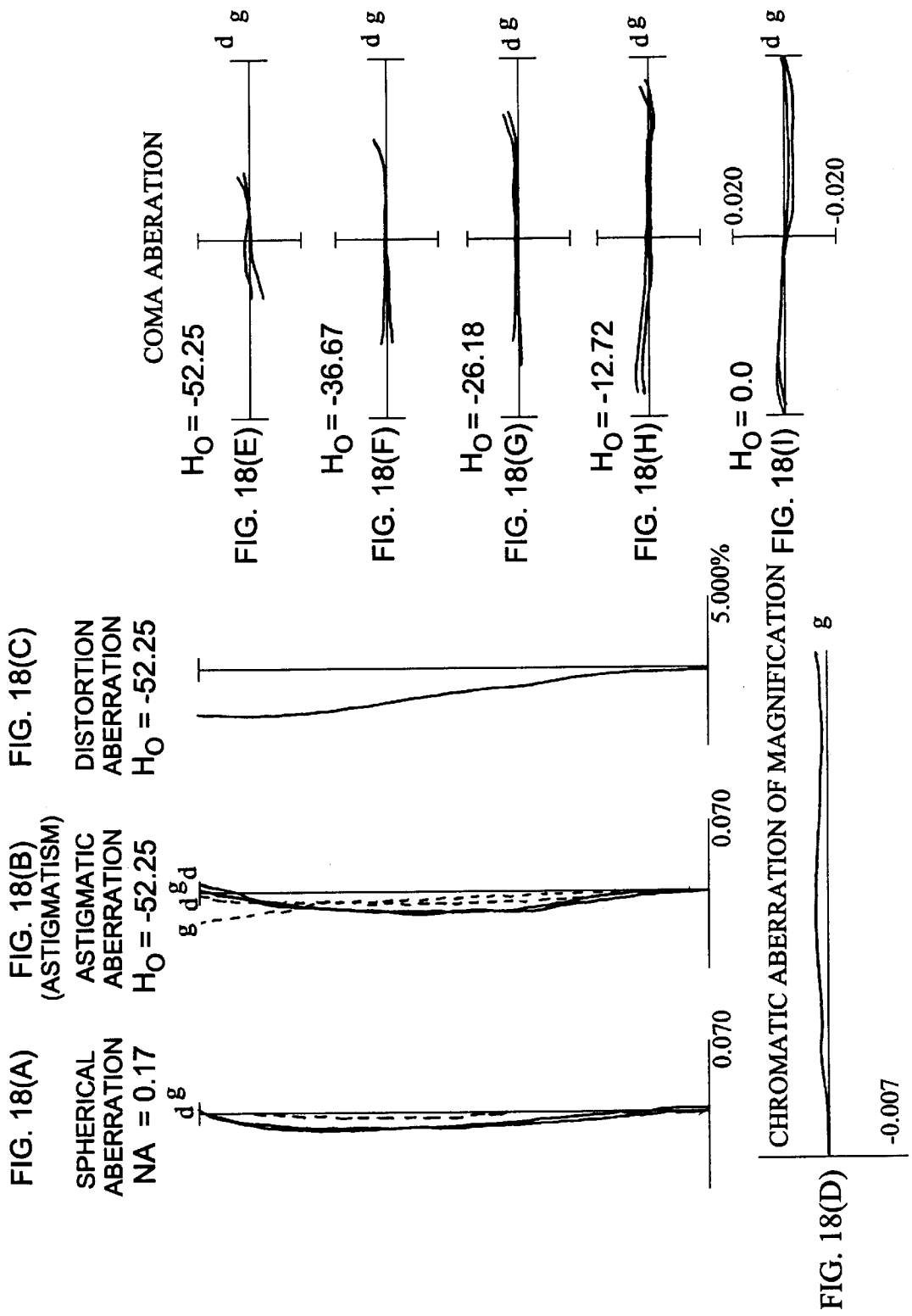
FIGS. 18(A)–(I) are aberrational graphs of the sixth embodiment ($\beta=-0.025$)
Figure 19:
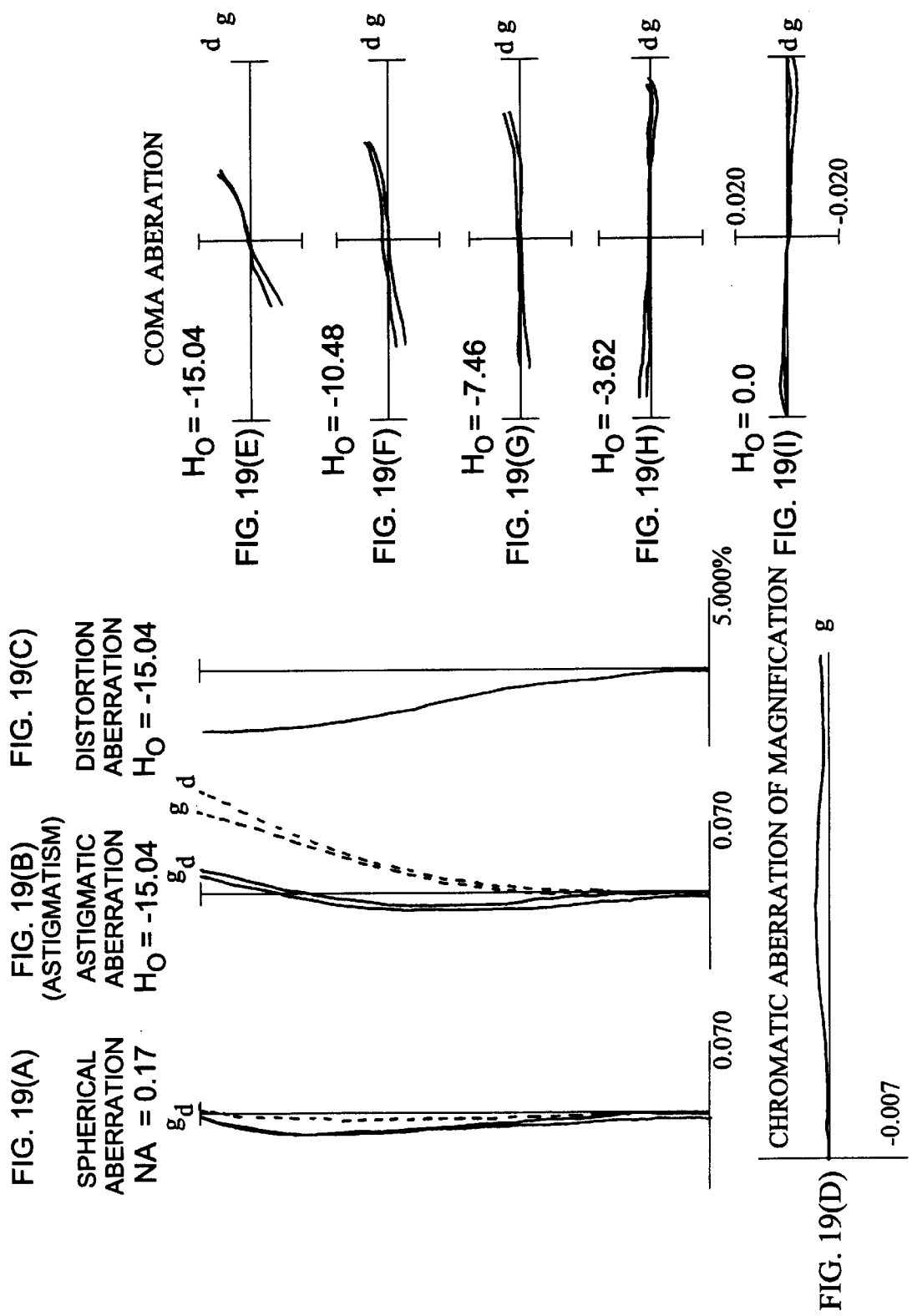
FIGS. 19(A)–(I) are aberrational graphs of the sixth embodiment ($\beta=-0.089$)
Figure 21:
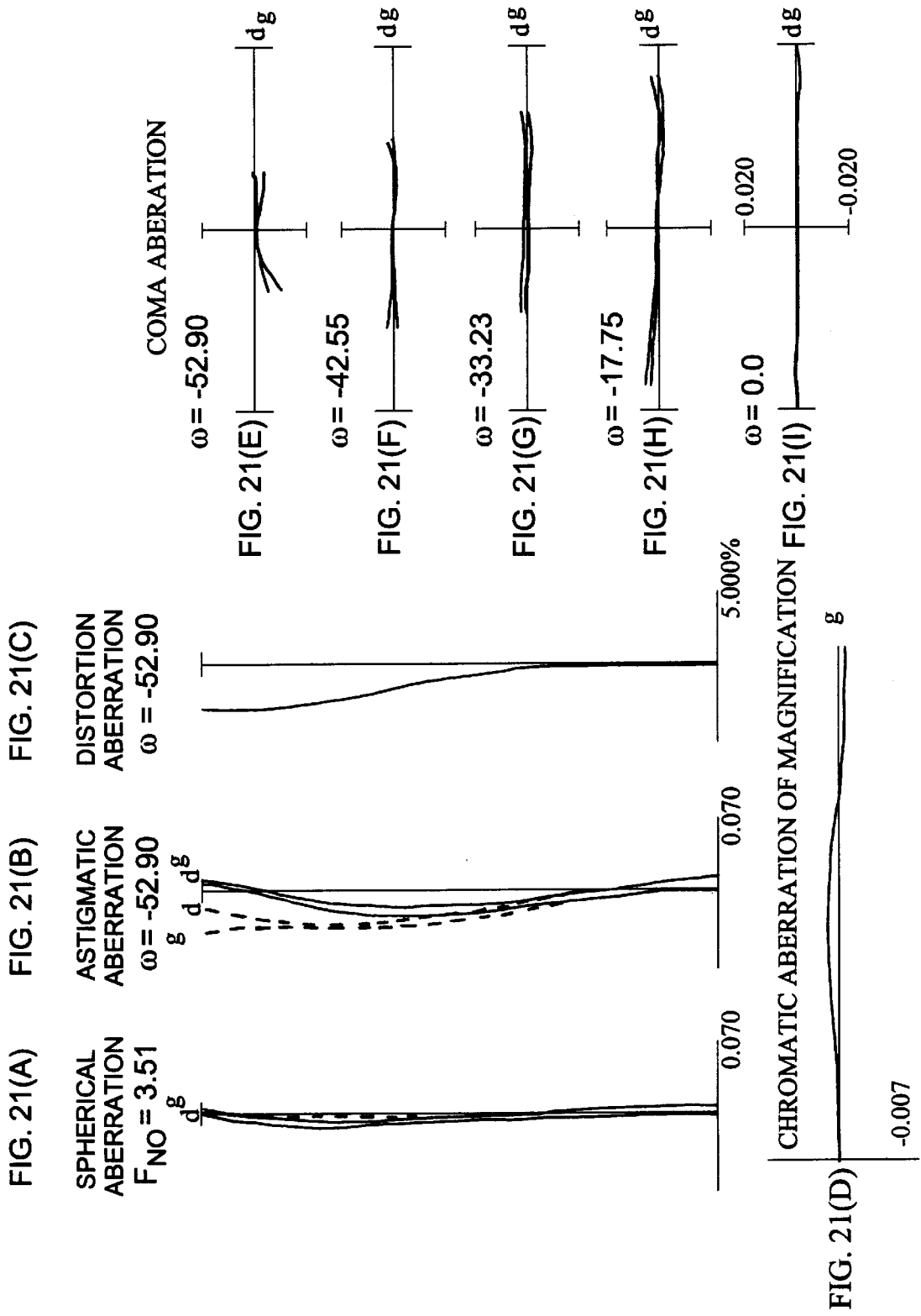
FIGS. 21(A)–(I) are aberrational graphs of the seventh embodiment ($D_0=\infty$)
Figure 22:
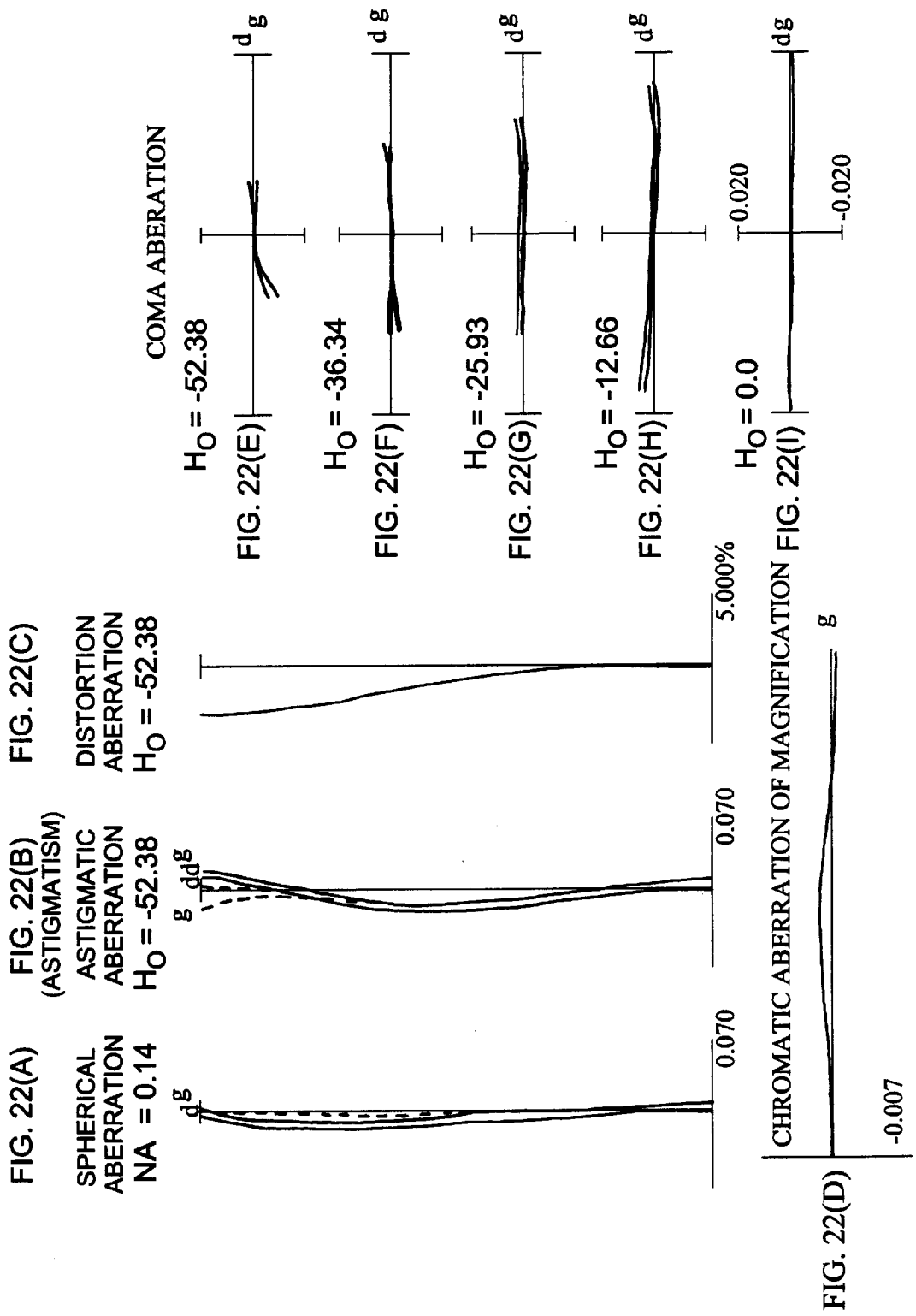
FIGS. 22(A)–(I) are aberrational graphs of the seventh embodiment ($\beta=-0.025$)
Figure 23:
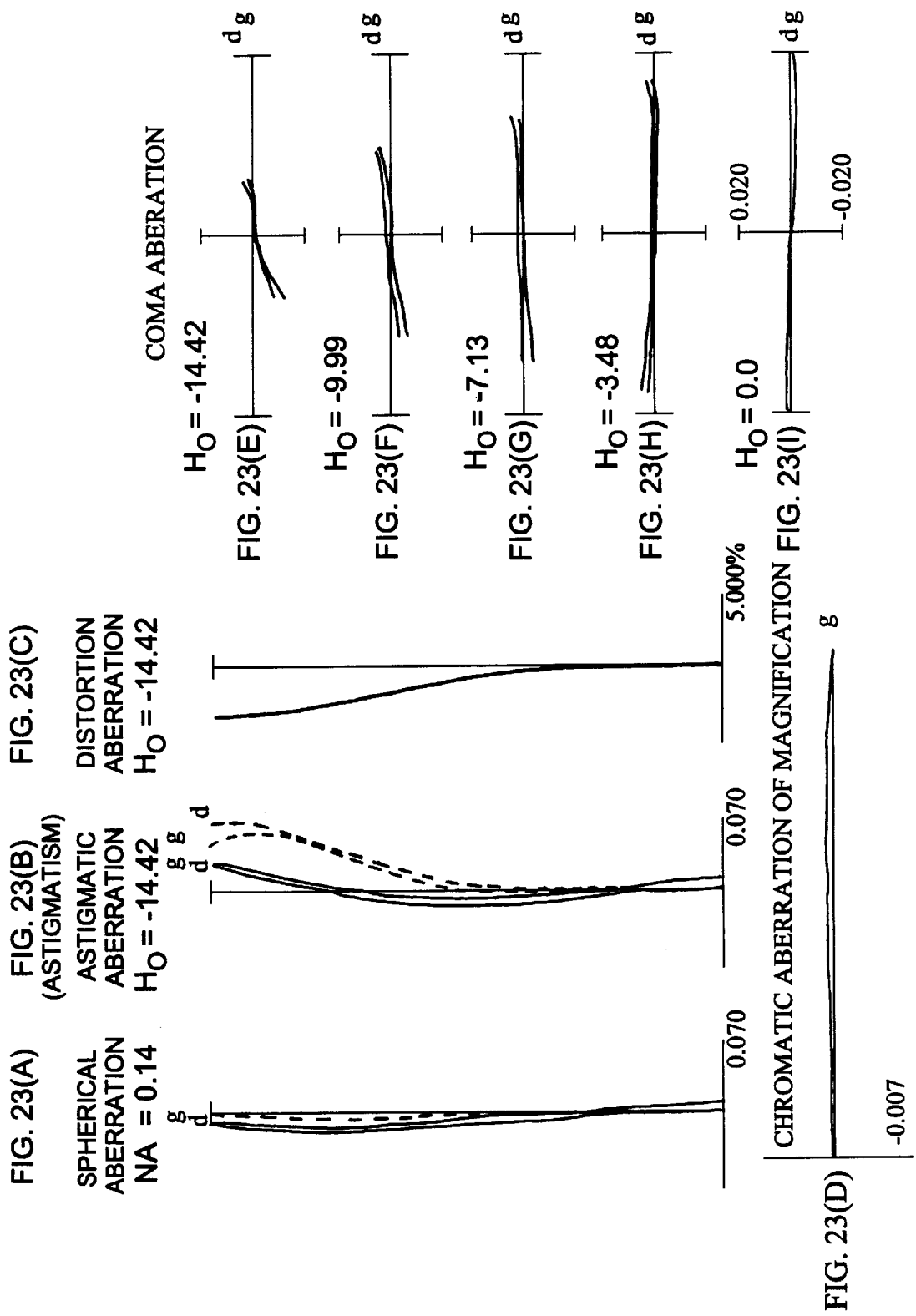
FIGS. 23(A)–(I) are aberrational graphs of the seventh embodiment ($\beta=-0.09$)
Figure 25:
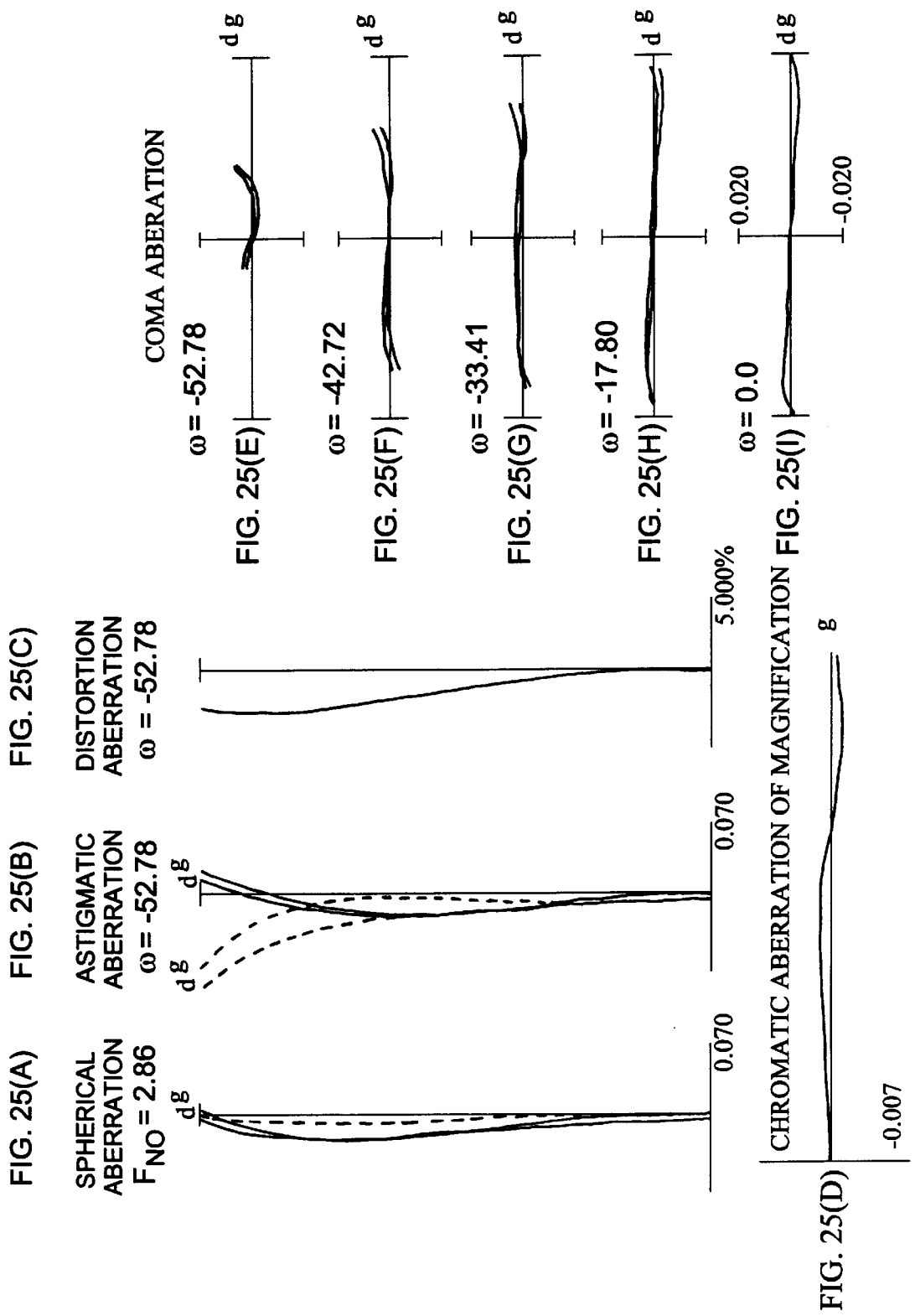
FIGS. 25(A)–(I) are aberrational graphs of the eighth embodiment ($D_0=\infty$)
Figure 26:
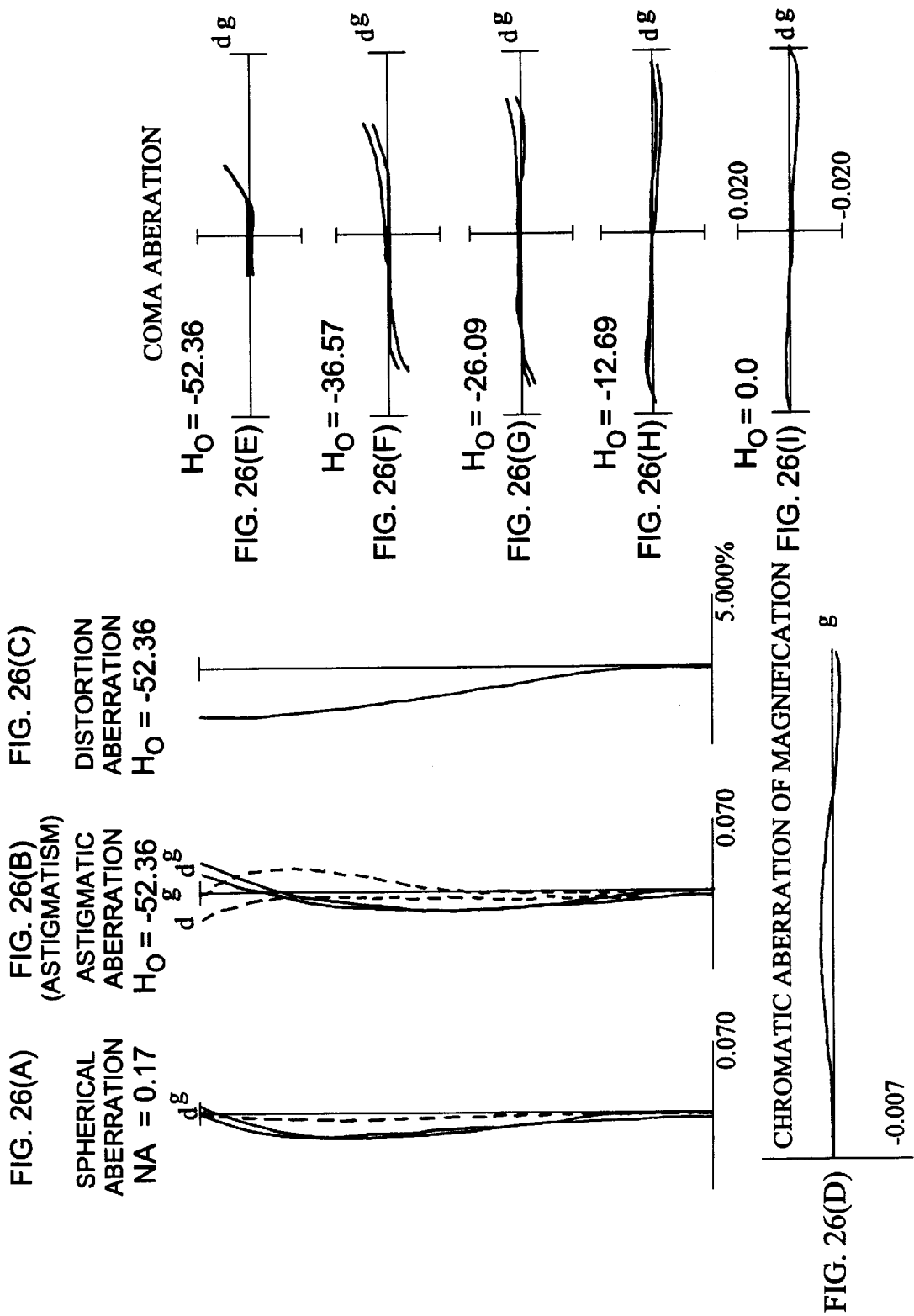
FIGS. 26(A)–(I) are aberrational graphs of the eighth embodiment ($\beta=-0.025$.
Figure 27:
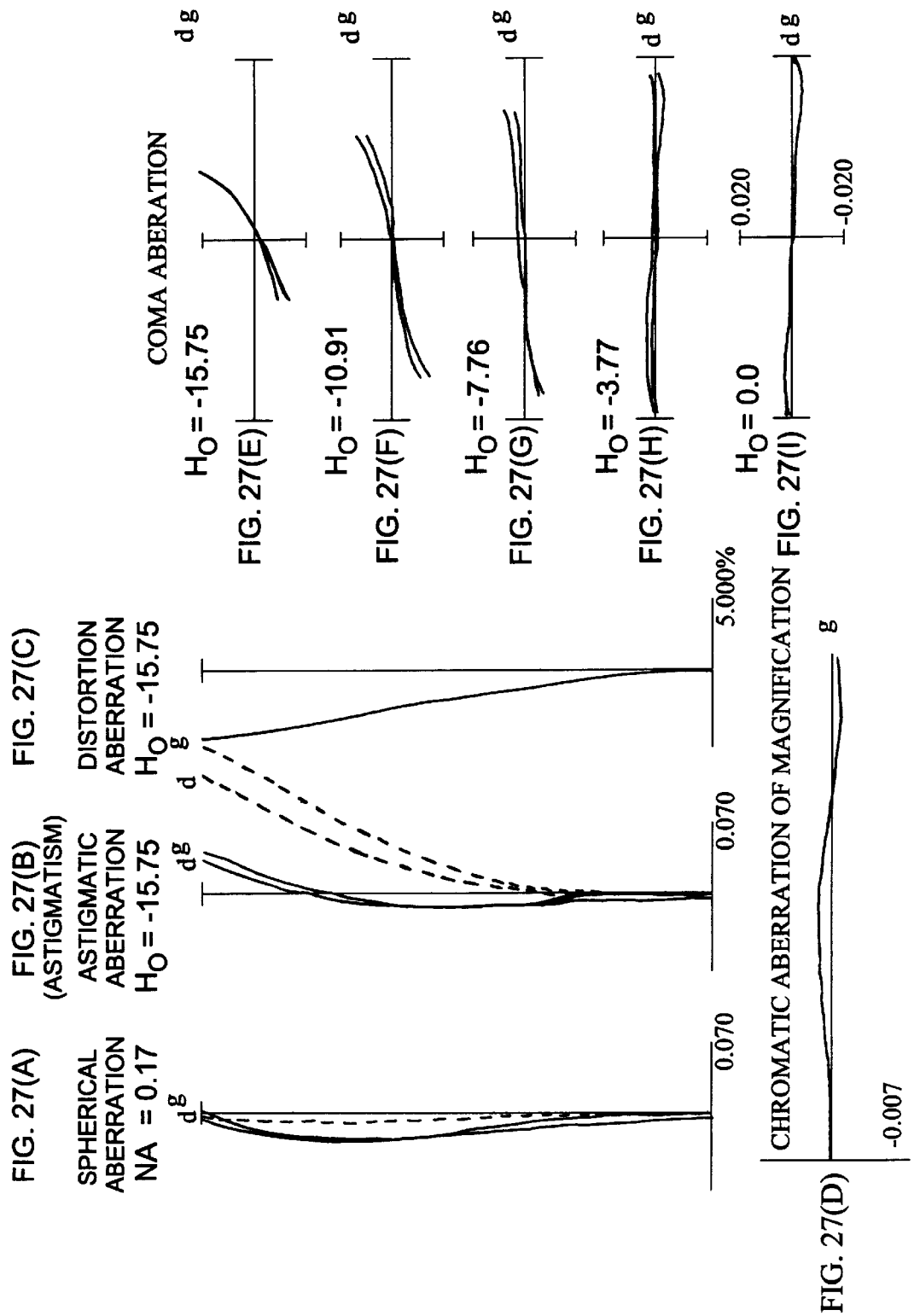
FIGS. 27(A)–(I) are aberrational graphs of the eighth embodiment ($\beta=-0.085$)

The aberration graphs for the first embodiment are shown in FIGS. 2(A)–(I) ($D_0$=∞) and in FIGS. 3(A)–(I) (β=−0.089); the aberration graphs for the second embodiment are shown in FIGS. 5(A)–(I) ($D_0$=∞) and in FIG. 6(A)–(I) (β=−0.089); the aberration graphs for the third embodiment are shown in FIGS. 8(A)–(I) ($D_0$=∞) and in FIGS. 9(A)–(I) (β=−0.1); the aberration graphs for the fourth embodiment are shown in FIGS. 11(A)–(I) ($D_0$=∞) and in FIG. 12(A)–(I) (β=−0.1); the aberration graphs for the fifth embodiment are shown in FIGS. 14(A)–(I) ($D_0$=∞) and in FIGS. 15(A)–(I) (β=−0.1); the aberration graphs for the sixth embodiment are shown in FIGS. 17(A)–(I) ($D_0$=∞), in FIGS. 18(A)–(I) (β=−0.025) and in FIGS. 19(A)–(I) (β=−0.089); the aberration graphs for the seventh embodiment are shown in FIGS. 21(A)–(I) ($D_0$=∞), in FIGS. 22(A)–(I) (β=−0.025) and in FIGS. 23(A)–(I) (β=−0.09); the aberration graphs for the eighth embodiment are shown in FIGS. 25(A)–(I) ($D_0$=∞), in FIGS. 26(A)–(I) (β=−0.025) and FIGS. 27(A)–(I) (β=−0.85); and the aberration graphs for the ninth embodiment are shown in FIGS. 29(A)–(I) ($D_0$=∞), in FIGS. 30(A)–(I) (β=−0.025) and FIGS. 31(A)–(I) (β=−0.1). In the figures for the spherical aberration, dotted lines indicate sine conditions. In the figures for the astigmatism, broken lines indicate meridianal image planes, and the solid lines indicate sagittal image planes. In the figures: the symbol $F_{NO}$ indicates the F numbers; the symbol NA indicates the number of apertures; the symbol ω indicates half angles of view; and the symbol $H_0$ indicates the entering height of a close object point.

As is clear from Table 6 and each aberrational figure of FIGS. 1–15, by satisfying prescribed lens composition and Condition (1), or additionally, by satisfying Conditions (2) to (9), a retrofocus type lens in which each aberration is well corrected can be obtained in each of embodiments 1–5. Furthermore, as is clear from Table 11 and each aberrational figure of FIGS. 16–31, by satisfying prescribed lens compositions and Conditions (3) and (4), or additionally, by satisfying Conditions (5) to (9), a retrofocus type lens in which each aberration is well corrected can be obtained in each of embodiments 6–9.

As described above, according to the invention, in a superwide angle retrofocus type lens in which the F number is between F3.5 to F2.8 (which is bright) and the angle of view 2ω is between 95° and 106°, a retrofocus type lens using a rear focus method can be obtained that is compact and has a small front lens group diameter in which aberrational fluctuation during focusing is small, and in which no fluctuation occurs in (i) the curvature of the image plane, (ii) astigmatism, and (iii) chromatic aberrations in magnification. Additionally, there is substantially no decrease in the amount of ambient light when focusing at a close distance (during near range focusing).

In the embodiments of the invention, an aspheric surface is used in the first lens group $G_1$. However, the size of the aperture can be increased by providing an additional aspheric surface in the second lens group $G_2$. Moreover, as is obvious from the spaces between the first lens group $G_1$ and the second lens group $G_2$ in each embodiment, the shortest shooting distance can be additionally shortened.

Furthermore, since independent aberrational corrections and achroma are realized with the first lens group $G_1$ and the second lens group $G_2$, the lens system can be changed to a shift and tilt lens by shifting the second lens group $G_2$ with respect to an optical axis of the first lens group $G_1$ or by tilting with respect to the film surface, while maintaining good aberrational correction using any embodiment in the invention. In addition, with similar mechanisms, the device can be used as a so-called anti-vibration lens. A case in which such mechanisms are applied is also in the scope of the invention.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A retrofocus type lens comprising, from an object side:
   a first lens group $G_1$ having negative refractive power, said first lens group $G_1$ having a negative meniscus lens component $L_A$ having a convex surface facing an object side and a positive lens component $L_B$ positioned closer to an image side than said negative meniscus lens component $L_A$, at least one surface among all of the lens surfaces of said first lens group $G_1$ being aspheric;
   a second lens group $G_2$ having positive refractive power, said second lens group $G_2$ having, from the object side, a front group $G_{2F}$ having positive refractive power and a rear group $G_{2R}$ having positive refractive power; and
   wherein focusing from an infinite object point to a near object point is accomplished by moving said front group $G_{2F}$ and said rear group $G_{2R}$ of said second lens group with different moving amounts.

2. The retrofocus type lens claimed in claim 1, wherein when the moving amount of said front group $G_{2F}$ and said rear group $G_{2R}$ during focusing from the infinite object point to the near object point are defined as $X_F$ and $X_R$, respectively, the following condition is satisfied:

$$1 < X_R/X_F \leq 5.$$

3. The retrofocus type lens claimed in claim 2, wherein focal lengths of the front group $G_{2F}$ and the rear group $G_{2R}$ of the second lens group are defined as $f_{2F}$ and $f_{2R}$, respectively, the following condition is satisfied:

$$0.1 \leq f_{2R}/f_{2F} \leq 5.$$

4. The retrofocus type lens claimed in claim 2, wherein when a focal length of said first lens group $G_1$ and a focal length of said second lens group $G_2$ during focusing in an infinite distance are defined as $f_1$ and $f_2$, respectively, the following condition is satisfied:

$$0.5 \leq |f_1|/f_2 \leq 2.4.$$

5. The retrofocus type lens claimed in claim 2, wherein when a focal length of the entire lens system and a space between said first lens group $G_1$ and said second lens group $G_2$ during focusing in the infinite distance are defined f and $D_{1-2}$, respectively, the following condition is satisfied:

$$0.3 \leq D_{1-2}/f \leq 2.5.$$

6. The retrofocus type lens claimed in claim 2, wherein when the focal length of the entire lens system and the focal length of said second lens group $G_2$ during focusing in the infinite distance are defined as f and $f_2$, respectively, the following condition is satisfied:

$$1.6 \leq f_2/f \leq 3.$$

7. The retrofocus type lens claimed in claim 2, wherein when a focal length of said first lens group $G_1$ and a focal length of said negative meniscus lens component $L_A$ of said first lens group $G_1$ are defined as $f_1$ and $f_A$, respectively, the following condition is satisfied:

$$0.1 \leq f_A/f_1 \leq 1.0.$$

8. The retrofocus type lens claimed in claim 2, wherein said positive lens component $L_B$ in said first lens group $G_1$ is positioned closest to an image side; and
   when an Abbe number referencing a d-line of said positive lens component $L_B$ is defined as $\nu_d$, the following condition is satisfied:

$$\nu_d < 45.$$

9. The retrofocus type lens claimed in claim 2, wherein said positive lens component $L_B$ in said first lens group $G_1$ is positioned closest to the image side; and
   when the focal length of said first lens group $G_1$ and the focal length of said positive lens component $L_B$ of said first lens group $G_1$ are defined as $f_1$ and $f_B$, respectively, the following condition is satisfied:

$$0.3 \leq f_B/|f_1| \leq 2.0.$$

10. The retrofocus type lens claimed in claim 2, wherein said second lens group $G_2$ has at least one pair of cemented lenses comprised by cementing a positive lens and a negative lens; and
    when refractive indices of said positive lens and said negative lens with respect to the d-line are defined as $n_p$ and $n_n$, respectively, the following condition is satisfied:

$$0.15 \leq n_n - n_p < 0.5.$$

11. The retrofocus type lens claimed in claim 2, wherein an aperture diaphragm is positioned in said second lens group $G_2$ or between said first lens $G_1$ and said second lens group $G_2$.

12. The retrofocus lens claimed in claim 11, wherein
    said aperture diaphragm is positioned in said second lens group $G_2$; and
    said second lens group $G_2$ includes a pair of cemented lenses each comprised by cementing a positive lens and a negative lens, one of said cemented lenses being positioned in front of and one behind said aperture diaphragm.

13. The retrofocus type lens claimed in claim 2, wherein a negative lens component is provided between said negative meniscus lens component $L_A$ and said positive lens component $L_B$ in said first lens group $G_1$.

14. The retrofocus type lens claimed in claim 2, wherein an image side lens surface of said negative meniscus lens component $L_A$ in said first lens group $G_1$ is aspheric.

15. The retrofocus type lens claimed in claim 1, wherein an aperture diaphragm is positioned in said second lens group $G_2$ or between said first lens group $G_1$ and said second lens group $G_2$.

16. The retrofocus type lens claimed in claim 15, wherein said aperture diaphragm is positioned in said second lens group $G_2$; and said second lens group $G_2$ includes a pair of cemented lenses each comprised by cementing a positive lens and a negative lens, one of said cemented lens being positioned in front of and one behind said aperture diaphragm.

17. The retrofocus type lens claimed in claim 1, wherein a negative lens component is provided between said negative meniscus lens component $L_A$ and said positive lens component $L_B$ in said first lens group $G_1$.

18. The retrofocus type lens claimed in claim 1, wherein an image side lens surface of said negative meniscus lens component $L_A$ in said first lens group $G_1$ is aspheric.

19. A retrofocus type lens comprising, from an object side:

a first lens group $G_1$ having negative refractive power, said first lens group $G_1$ having a negative meniscus lens component $L_A$ having a convex surface facing an object side and a positive lens component $L_B$ positioned closer to an image side than said negative meniscus lens component $L_A$, at least one surface among all of the lens surfaces of said first lens group $G_1$ being aspheric;

a second lens group $G_2$ having positive refractive power, said second lens group $G_2$ having, from the object side, a front group $G_{2F}$ having positive refractive power and a rear group $G_{2R}$ having positive refractive power;

wherein focusing from an infinite object point to a near object point is accomplished by moving said front group $G_{2F}$ and said rear group $G_{2R}$ of said second lens group with different moving amounts; and wherein when a focal length of said first lens group $G_1$ and a focal length of said second lens group $G_2$ when focusing in an infinite distance as $f_1$ and $f_2$, respectively, the following condition is preferably satisfied:

$$0.5 \leq |f_1|/f_2 < 2.4.$$

20. A retrofocus type lens comprising, from an object side:

a first lens group $G_1$ having negative refractive power, said first lens group $G_1$ having a negative meniscus lens component $L_A$ having a convex surface facing an object side and a positive lens component $L_B$ positioned closer to an image side than said negative meniscus lens component $L_A$, at least one surface among all of the lens surfaces of said first lens group $G_1$ being aspheric;

a second lens group $G_2$ having positive refractive power, said second lens group $G_2$ having, from the object side, a front group $G_{2F}$ having positive refractive power and a rear group $G_{2R}$ having positive refractive power; focusing from an infinite object point to a near object point being accomplished by moving said front group $G_{2F}$ and said rear group $G_{2R}$ of said second lens group with different moving amounts; and wherein when a focal length of the entire lens system and a space between said first lens group $G_1$ and said second lens group $G_2$ during focusing in the infinite distance are defined as f and $D_{1\text{-}2}$, respectively, the following condition is satisfied:

$$0.3 \leq D_{1\text{-}2}/f \leq 2.5.$$

21. A retrofocus type lens comprising, from an object side:

a first lens group $G_1$ having negative refractive power, the first lens group $G_1$ having a negative meniscus lens component $L_A$ having a convex surface facing the object side and a positive lens component positioned closer to an image side than the negative meniscus lens component $L_A$, at least one surface among each lens surface of the first lens group $G_1$ being aspheric; and a second lens group $G_2$ having positive refractive power;

focusing from an infinite object point to a close object point being done by moving said the second lens group $G_2$ toward the object side; and when a focal length of the entire system is defined as f, focal lengths of said first lens group $G_1$ and said second lens group $G_2$ are defined as $f_1$ and $f_2$, respectively, and a space between both lens groups $G_1$ and $G_2$ when focusing on the infinite object point are defined as $D_{1\text{-}2}$, the following conditions are satisfied:

$$0.5 \leq |f_1|/f_2 \leq 2.4$$

$$0.3 \leq D_{1\text{-}2}/f \leq 2.5.$$

22. The retrofocus type lens claimed in claim 21, wherein an aperture diaphragm is positioned in said second lens group $G_2$ or between said first lens group $G_1$ and said second lens group $G_2$.

23. The retrofocus type lens claimed in claim 22, wherein said aperture diaphragm is positioned in said second lens group $G_2$, and said second lens group $G_2$ includes at least one pair of cemented lenses comprised by cementing a positive lens and a negative lens, one cemented lens being positioned in front of said aperture diaphragm, and one cement lens being positioned behind said aperture diaphragm.

24. The retrofocus type lens claimed in claim 21, wherein a negative lens component is provided between said negative meniscus lens component $L_A$ and the positive lens component $L_B$ in said first lens group $G_1$.

25. The retrofocus type lens claimed in claim 21, wherein an image side lens surface of said negative meniscus lens component $L_A$ in said first lens group $G_2$ is aspheric.

26. The retrofocus type lens claimed in claim 21, wherein the following condition is satisfied:

$$1.6 \leq f_2/f \leq 3.$$

27. The retrofocus type lens claimed in claim 26, wherein an aperture diaphragm is positioned in said second lens group $G_2$ or between said first lens group $G_1$ and said second lens group $G_2$.

28. The retrofocus type lens claimed in claim 27, wherein said aperture diaphragm is positioned in said second lens group $G_2$, and said second lens group $G_2$ includes at least one pair of cemented lens comprised by cementing a positive lens and a negative lens, one cemented lens being positioned in front of said aperture diaphragm and one cemented lens being positioned behind said aperture diaphragm.

29. The retrofocus type lens claimed in claim 26, wherein a negative lens component is provided between said negative meniscus lens component $L_A$ and said positive lens component $L_B$ in said first lens group $G_1$.

30. The retrofocus type lens claimed in claim 26, wherein an image side lens surface of said negative meniscus lens component $L_A$ in said first lens group $G_2$ is aspheric.

31. The retrofocus type lens claimed in claim 26, wherein said negative meniscus lens component $L_A$ in said first lens group $G_1$ is positioned closest to the object side, and when a focal length of said negative meniscus lens component $L_A$ is defined as $f_A$, the following condition is satisfied:

$$0.1 \leq f_A/f_1 \leq 1.0.$$

32. The retrofocus type lens claimed in claim 31, wherein an aperture diaphragm is positioned in said second lens group $G_2$ or between said first lens group $G_1$ and said second lens group $G_2$.

33. The retrofocus type lens claimed in claim 32, wherein said aperture diaphragm is positioned in said second lens group $G_2$, and said second lens group $G_2$ includes at least one pair of cemented lens comprised by cementing a positive lens and a negative lens, one cemented lens being positioned in front of said aperture diaphragm and one cemented lens being positioned behind said aperture diaphragm.

34. The retrofocus type lens claimed in claim 31, wherein a negative lens component is provided between said negative meniscus lens component $L_A$ and the positive lens component $L_B$ in said first lens group $G_1$.

35. The retrofocus type lens claimed in claim 31, wherein an image side lens surface of said negative meniscus lens component $L_A$ in said first lens group $G_2$ is aspheric.

36. The retrofocus type lens claimed in claim 31, wherein said positive lens component $L_B$ in said first lens group $G_1$ is positioned closest to the image side, and when an Abbe number of the positive lens component $L_B$ referring to a d-line is defined as $v_d$, the following condition is satisfied:

$$v_d < 45.$$

37. The retrofocus type lens claimed in claim 36, wherein said positive lens component $L_B$ in said first lens group $G_1$ is positioned closest to the image side, and when a focal length of the positive lens component $L_B$ is defined as $f_B$, the following condition is satisfied:

$$0.3 \leq f_B/|f_1| \leq 2.0.$$

38. The retrofocus type lens claimed in claim 37, wherein said second lens group $G_2$ has at least one pair of cemented lenses comprised by cementing a positive lens and a negative lens, and when the refractive indices of said positive lens and said negative lens of the cemented lens with respect to the d-line are defined as $n_p$ and $n_n$, respectively, the following condition is satisfied:

$$0.15 \leq n_n - n_p \leq 0.5.$$

* * * * *